United States Patent …

(12) United States Patent
Kajiya

(10) Patent No.: US 12,502,864 B2
(45) Date of Patent: Dec. 23, 2025

(54) OPTICAL BODY, OPTICAL FILM ADHESIVE BODY, AND METHOD FOR MANUFACTURING OPTICAL BODY

(71) Applicant: DEXERIALS CORPORATION, Tokyo (JP)

(72) Inventor: Shunichi Kajiya, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 93 days.

(21) Appl. No.: 15/538,088

(22) PCT Filed: Nov. 17, 2015

(86) PCT No.: PCT/JP2015/082224
§ 371 (c)(1),
(2) Date: Jun. 20, 2017

(87) PCT Pub. No.: WO2016/103980
PCT Pub. Date: Jun. 30, 2016

(65) Prior Publication Data
US 2017/0348943 A1 Dec. 7, 2017

(30) Foreign Application Priority Data
Dec. 25, 2014 (JP) .................................. 2014-263615

(51) Int. Cl.
*B32B 3/30* (2006.01)
*B29D 11/00* (2006.01)
(Continued)

(52) U.S. Cl.
CPC .......... *B32B 3/30* (2013.01); *B29D 11/00288* (2013.01); *B29D 11/00788* (2013.01);
(Continued)

(58) Field of Classification Search
CPC .. B32B 3/00; B32B 3/26; B32B 3/263; B32B 3/30; B32B 3/28; Y10T 428/22479;
(Continued)

(56) References Cited

U.S. PATENT DOCUMENTS

2011/0159245 A1* 6/2011 Taniguchi .............. H05K 3/025
428/172
2012/0100346 A1* 4/2012 Tazawa .................. G02B 1/118
428/172
(Continued)

FOREIGN PATENT DOCUMENTS

JP   2002-267816 A   9/2002
JP   2003-098304     4/2003
(Continued)

OTHER PUBLICATIONS

Sep. 3, 2018, Chinese Office Action issued for related CN Application No. 201580070908.2.
(Continued)

*Primary Examiner* — Maria V Ewald
*Assistant Examiner* — Ethan A. Utt
(74) *Attorney, Agent, or Firm* — Paratus Law Group, PLLC

(57) ABSTRACT

There is provided a new and improved optical body, optical film adhesive body, and method for manufacturing an optical body, in which a concave-convex structure of an optical film can be protected without the use of a protective film, the optical film can be made thinner, the handling properties can be improved, the occurrence of defects caused by a difference in the refractive index between an adhesive layer and the optical film can be minimized, and the optical film can be applied more firmly to the adherend, the optical body including: an optical film provided with first and second concave-convex structures; and a master film in which an (Continued)

average period of concavities and convexities of the first concave-convex structure is less than or equal to visible light wavelengths, and the master film is provided with a third concave-convex structure which has a reverse shape of the first concave-convex structure.

22 Claims, 21 Drawing Sheets

(51) Int. Cl.
    *B32B 7/12*       (2006.01)
    *B32B 27/08*     (2006.01)
    *B32B 37/00*     (2006.01)
    *G02B 1/118*     (2015.01)
    *G03F 7/00*      (2006.01)

(52) U.S. Cl.
    CPC ............... *B32B 7/12* (2013.01); *B32B 27/08* (2013.01); *B32B 37/025* (2013.01); *G02B 1/118* (2013.01); *G03F 7/0002* (2013.01); *B32B 2305/72* (2013.01); *B32B 2307/40* (2013.01); *B32B 2309/105* (2013.01)

(58) Field of Classification Search
    CPC ..... Y10T 428/24521; Y10T 428/24529; Y10T 428/24537; Y10T 428/24545; Y10T 428/24554; Y10T 428/2457; Y10T 428/24579; Y10T 428/24587; Y10T 428/24612; Y10T 428/24479; Y10T 428/24488; Y10T 428/24496; Y10T 428/24504; Y10T 428/24512; Y10T 428/24562; Y10T 428/24595; Y10T 428/24603; Y10T 428/2462; Y10T 428/24628; Y10T 428/24653; Y10T 428/24661; Y10T 428/24669; Y10T 428/24678; Y10T 428/24686; Y10T 428/24694; Y10T 428/24702; Y10T 428/24711; Y10T 428/24719; Y10T 428/24727; Y10T 428/24736; Y10T 428/14; Y10T 428/1424; Y10T 428/1429; Y10T 428/1438; Y10T 428/1452; Y10T 428/1462; Y10T 428/1471; Y10T 428/1476; Y10T 428/1481; G02B 1/11; G02B 1/111; G02B 1/113; G02B 1/118; G02B 1/10; G02B 1/105; G02B 1/115; G02B 1/116; G02B 1/12; G02B 1/14; G02B 1/00; G02B 1/04; G02B 5/00; G02B 5/02; G02B 5/021; G02B 5/0215; G02B 5/0231; G02B 5/0273; G02B 5/0294; G02B 2207/00; G02B 2207/101; Y10S 977/70; Y10S 977/755; Y10S 977/778; Y10S 977/782; Y10S 977/783; Y10S 977/788; Y10S 977/789; Y10S 977/809; Y10S 977/811; Y10S 977/832; Y10S 977/834; Y10S 977/887; B82Y 20/00; B82Y 30/00
    USPC ........ 428/161–165, 156–173, 174, 177–187, 428/161–163, 167–169, 179–182, 40.1, 428/40.6, 40.7, 40.9, 41.3, 41.5, 41.7, 428/41.8, 41.9; 359/601; 977/700, 755, 977/778, 782, 783, 788, 789, 809, 811, 977/832, 834, 887, 877
    See application file for complete search history.

(56) References Cited

U.S. PATENT DOCUMENTS

| | | | | |
|---|---|---|---|---|
| 2012/0160560 | A1* | 6/2012 | Kajiya | B32B 3/30 174/70 R |
| 2013/0004711 | A1 | 1/2013 | Doi et al. | |
| 2014/0065367 | A1* | 3/2014 | Matsumoto | C08F 290/067 252/582 |
| 2014/0220306 | A1* | 8/2014 | Uchida | B32B 27/16 428/172 |
| 2015/0231854 | A1* | 8/2015 | Nakai | B32B 3/30 428/172 |

FOREIGN PATENT DOCUMENTS

| | | | | |
|---|---|---|---|---|
| JP | 2011-053496 | | 3/2011 | |
| JP | 2011-088356 | | 5/2011 | |
| JP | 2011-088356 | A | 5/2011 | |
| JP | 2011-221131 | | 11/2011 | |
| JP | 2011-230431 | | 11/2011 | |
| JP | 2012-143936 | | 8/2012 | |
| JP | 2012-143936 | A | 8/2012 | |
| JP | 2013-001007 | | 1/2013 | |
| KR | 10-2012-0139797 | A | 12/2012 | |
| KR | 10-2014-0046056 | A | 4/2014 | |
| TW | 201210828 | A | 3/2012 | |
| TW | 201214471 | A | 4/2012 | |
| TW | 201422439 | A | 6/2014 | |
| WO | WO2011/129378 | A1 | 10/2011 | |
| WO | WO-2012157717 | A1 * | 11/2012 | ......... B29C 35/0805 |
| WO | WO2014/065136 | A1 | 5/2014 | |

OTHER PUBLICATIONS

Apr. 9, 2019, Taiwanese Office Action issued for related TW Application No. 104137887.
May 10, 2019, Chinese Office Action issued for related CN Application No. 201580070908.2.
Jun. 17, 2022, Korean Office Action issued for related KR Application No. 10-2017-7016494.

* cited by examiner

CROSS-SECTION ALONG X-X

FIG. 4A
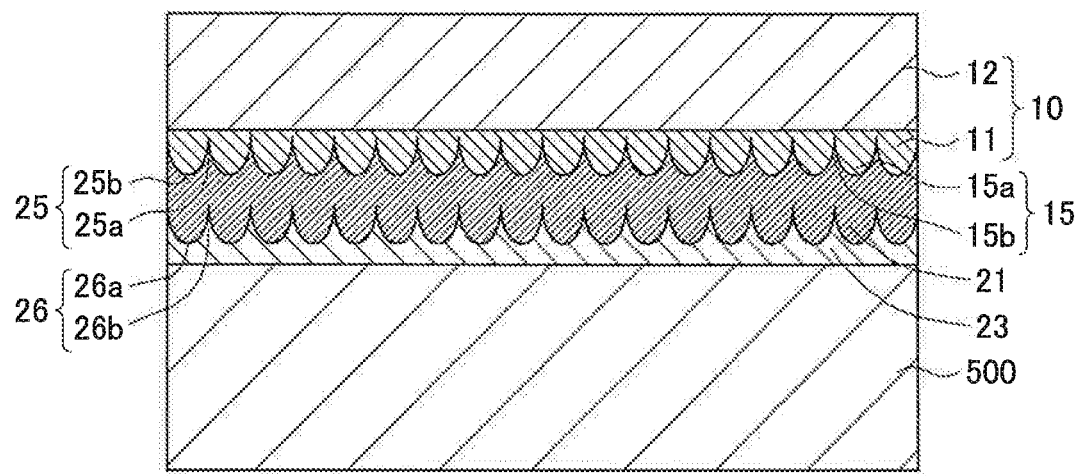
FIG. 4B
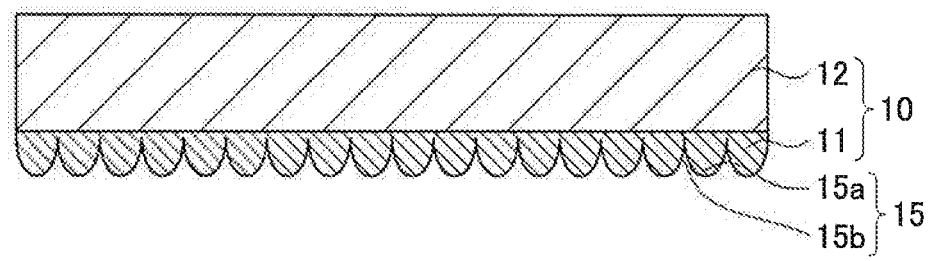
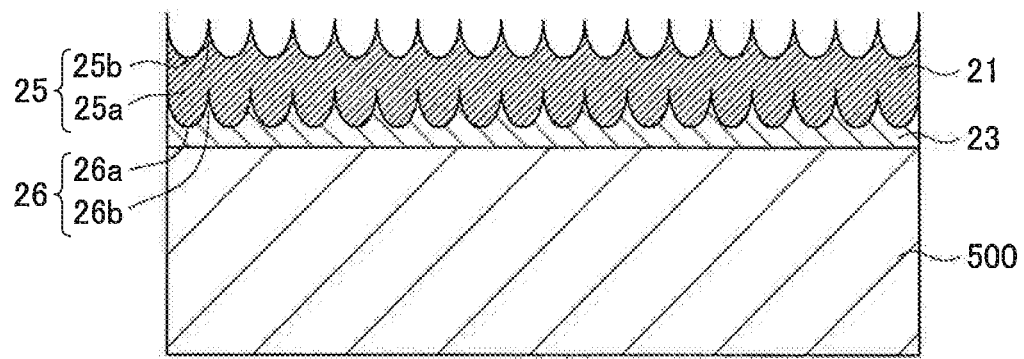

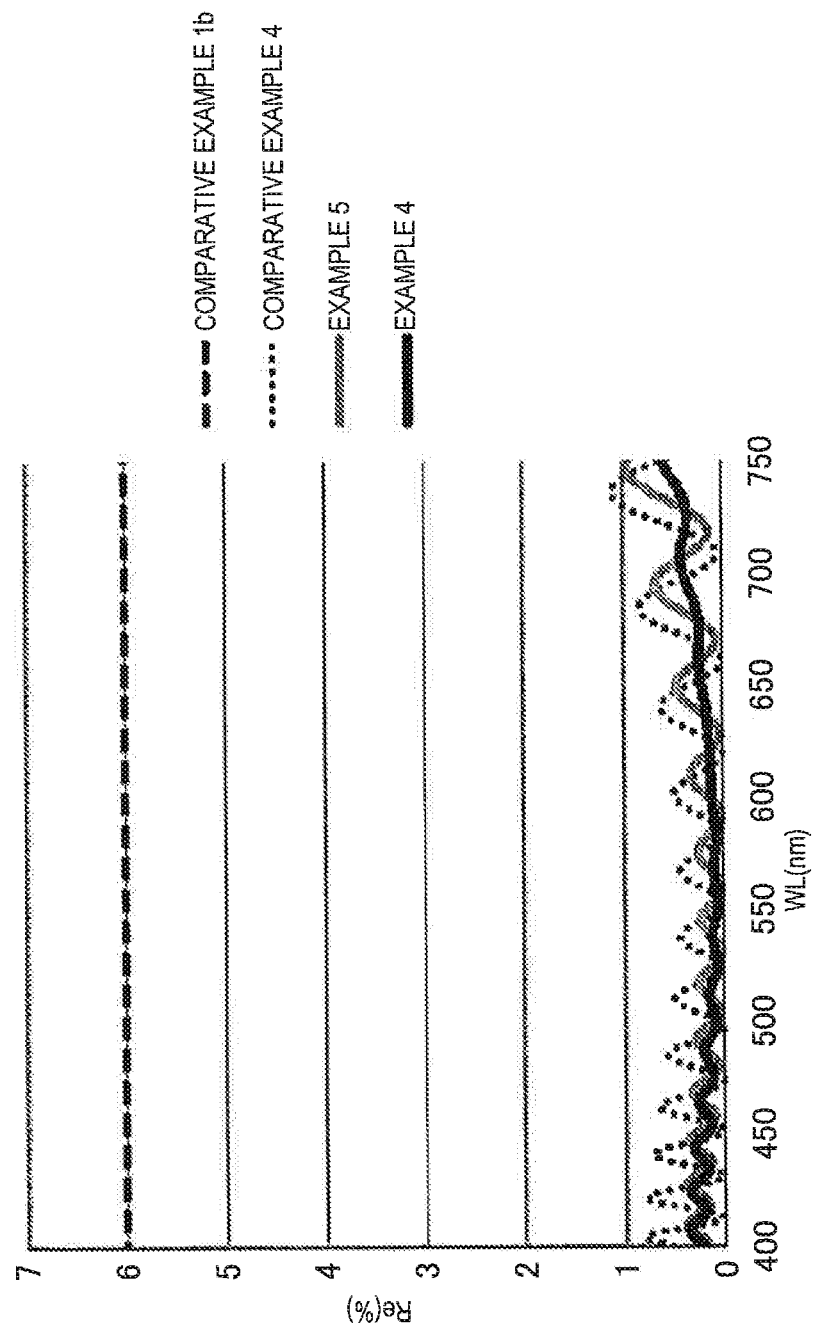

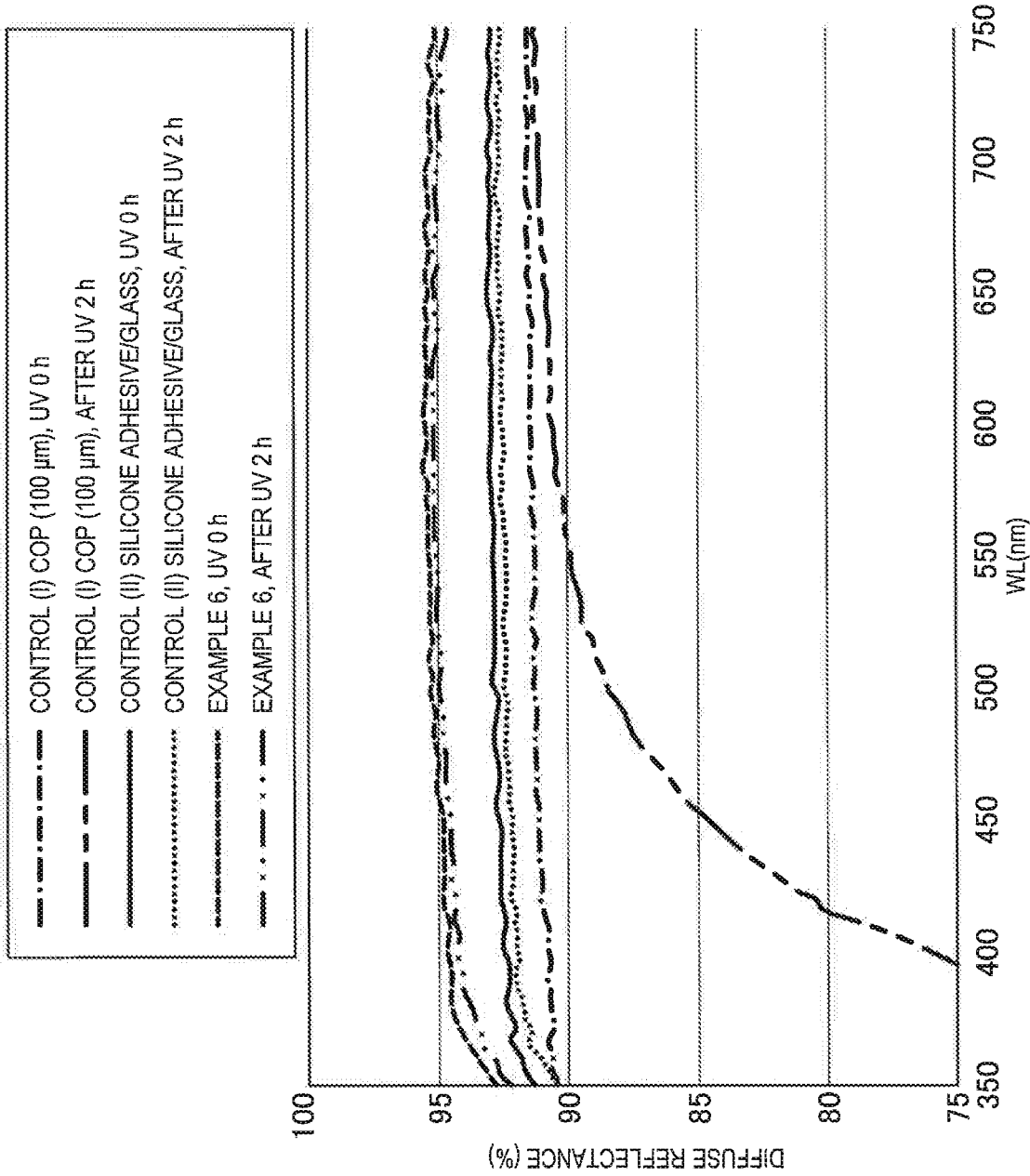

OPTICAL BODY, OPTICAL FILM ADHESIVE BODY, AND METHOD FOR MANUFACTURING OPTICAL BODY

CROSS REFERENCE TO PRIOR APPLICATION

This application is a National Stage patent application of PCT International Patent Application No. PCT/JP2015/082224 (filed on Nov. 17, 2015) under 35 U.S.C. § 371, which claims priority to Japanese Patent Application No. 2014-263615 (filed on Dec. 25, 2014), which are all hereby incorporated by reference in their entirety.

TECHNICAL FIELD

The present invention relates to an optical body, an optical film adhesive body, and a method for manufacturing an optical body.

BACKGROUND ART

An optical film on which is formed a concave-convex structure in which the average period of the concavities and convexities is less than or equal to the visible light wavelengths has excellent anti-reflective effects for light in the visible light wavelength region. Consequently, an optical film having a concave-convex structure is used as an anti-reflective film, for example. Such a concave-convex structure is also called a moth-eye structure. Optical films on which a concave-convex structure is formed are disclosed in Patent Literatures 1 and 2, for example.

As a method of forming a concave-convex structure, there is the UV nanoimprint method disclosed in Patent Literature 1, for example. With the UV nanoimprint method, there is produced a master on the surface of which is formed a concave-convex structure. Subsequently, by coating a base material with an uncured light-curing resin, an uncured resin layer is formed on the base material. Subsequently, the uncured resin layer is transferred onto the concave-convex structure of the master, and the uncured resin layer is cured. Consequently, a concave-convex structure is formed on the base material (with this concave-convex structure having the reverse shape of the concave-convex structure of the master).

Meanwhile, as disclosed in Patent Literature 2, for example, a protective film is applied to the concave-convex structure of an anti-reflective film in some cases, to protect the concave-convex structure during storage, transport, usage, or the like of the anti-reflective film. The protective film is applied to the concave-convex structure with an adhesive. For this reason, when the protective film is peeled away from the concave-convex structure, in some cases residual adhesive may remain on the concave-convex structure. If residual adhesive remains on the concave-convex structure, in some cases the properties of the anti-reflective film may be degraded by the adhesive. A conceivable method of addressing this issue is to lower the adhesion of the adhesive, but with this method, the protective film disengages more readily from the concave-convex structure. In other words, there is a possibility that the concave-convex structure may be insufficiently protected by the protective film. Accordingly, Patent Literature 2 proposes the use of a protective film using a specific adhesive.

CITATION LIST

Patent Literature

Patent Literature 1: JP 2011-053496A
Patent Literature 2: JP 2011-088356A

SUMMARY OF INVENTION

Technical Problem

Meanwhile, to ensure the handling properties of the anti-reflective film, some degree of thickness in the anti-reflective film has been necessary. However, if the anti-reflective film is too thick, there is a problem in that the adhesive body of the anti-reflective film becomes thick. Furthermore, if the anti-reflective film is applied to an adherend with large concavities and convexities on the surface thereof, there is a problem in that the anti-reflective film cannot sufficiently follow the concavities and convexities on the surface of the adherend.

For example, as illustrated in FIG. 11, when using an adhesive layer 53 with a thickness of 25 μm to apply an anti-reflective film 52 with a thickness of 50 μm to a touch panel 50 having a frame body 51 with a height s of 50 μm, in some cases the anti-reflective film 52 is unable to conform to the height s of the frame body 51. In this case, after the adhesion of the anti-reflective film 52, an air gap 54 is formed at the perimeter of the frame body 51, thereby degrading the appearance of the touch panel 50.

Furthermore, when applying an anti-reflective film to an adherend with an adhesive agent, the refractive index of the anti-reflective film and the refractive index of the adhesive layer do not match in some cases. In such cases, there is a possibility that the reflectivity of the anti-reflective film may be degraded (that is, the reflectivity may increase). Furthermore, there is also a possibility that ripples may form and produce flaws in appearance, such as interference patterns.

A conceivable method of addressing the above issue is to form a concave-convex structure directly on the surface of the adherend. This method is somewhat effective if the surface of the adherend is flat and elements such as a frame body and wiring do not exist around the adherend, or alternatively, if the adherend is formed from a flexible member. However, in cases other than the above (such as if the surface of the adherend is curved, or if elements such as a frame body and wiring exist around the adherend, for example), there is a problem in that the quality of the concave-convex structure becomes inconsistent. Furthermore, forming the concave-convex structure directly on the surface of the adherend may interfere with subsequent processing steps in some cases. Consequently, the above issue cannot be solved fundamentally with this method.

Also, another conceivable method of addressing the above issue is to make the protective film thicker disclosed by Patent Literature 2. According to this method, the anti-reflective film is transported or the like as an optical body integrated with the protective film, thereby improving the handling properties of the optical body, and by extension, also improving the handling properties of the anti-reflective film. However, since this method requires a protective film, the demand to protect the concave-convex structure without the use of a protective film cannot be met.

Also, with the technology disclosed in Patent Literature 2, the protective film is peeled away from the anti-reflective film after the optical body integrated with the protective film and the anti-reflective film is applied to the adherend. At this point, there is another problem in that the anti-reflective film may possibly disengage from the adherend.

Accordingly, the present invention has been devised in light of the above issues, and an objective of the present invention is to provide a new and improved optical body, an optical film adhesive body, and a method for manufacturing an optical body, in which the concave-convex structure of the optical film can be protected without the use of a protective film, the optical film can be made thinner, the handling properties can be improved, the occurrence of defects caused by a difference in the refractive index between the adhesive layer and the optical film can be minimized, and the optical film can be applied more firmly to the adherend.

Solution to Problem

The inventor discovered the following matters, and as a result, conceived the present invention. Namely, (i) in the case where a master film is produced by using as a transfer mold a master (first master) on which a concave-convex structure (fourth concave-convex structure) is formed, an optical film may be produced by using the master film as a transfer mold. Furthermore, such a master film may be used as a protective film for the optical film. A concave-convex structure (first concave-convex structure) is formed on one surface of the optical film, namely the surface on the master film side.

(ii) An optical body that includes an optical film and a master film is able to gain thickness due to the master film. For this reason, the optical film may be made thinner while still improving the handling properties of the optical film.

(iii) By using the master film as a protective film for the optical film, it becomes unnecessary to prepare a separate protective film.

(iv) In the case of forming a concave-convex structure (second concave-convex structure) on the other surface of optical film, and additionally providing an adhesive layer on top of the second concave-convex structure, the adhesive strength between the optical film and the adhesive layer increases due to the anchor effect provided by the second concave-convex structure. Consequently, when applying the optical film to the adherend, the optical film is applied more firmly to the adherend. As a result, for example, when the master film is peeled away from the optical film after applying the optical film to the adherend, the optical film becomes less likely to disengage from the adherend.

(v) The second concave-convex structure reduces optical reflection caused by a difference in the refractive index between the adhesive layer and the optical film. As a result, the production of defects caused by such a difference in the refractive index (degraded reflectivity, ripple formation) is minimized.

(vi) The master film may also be used as an optical film (for example, an anti-reflective film).

According to an aspect of the present invention, there is provided an optical body, including: an optical film provided with a first concave-convex structure formed on one surface of the optical film, and a second concave-convex structure formed on an other surface of the optical film; and a master film that covers the first concave-convex structure, in which an average period of concavities and convexities of the first concave-convex structure is less than or equal to visible light wavelengths, and the master film is provided with a third concave-convex structure which is formed on a surface that faces the first concave-convex structure, and which has a reverse shape of the first concave-convex structure.

Here, an aspect ratio of the second concave-convex structure may be smaller than an aspect ratio of the first concave-convex structure, the aspect ratio of the first concave-convex structure may be a ratio of a height of convexities constituting the first concave-convex structure and a diameter of a bottom face of concavities constituting the first concave-convex structure, and the aspect ratio of the second concave-convex structure may be a ratio of a height of convexities constituting the second concave-convex structure and a diameter of a bottom face of concavities constituting the second concave-convex structure.

Further, a density of concavities and convexities of the second concave-convex structure may be smaller than a density of concavities and convexities of the first concave-convex structure.

Further, a thickness of the optical film may be from 1 μm to 60 μm.

Further, an average period of concavities and convexities of the second concave-convex structure may be less than or equal to visible light wavelengths.

Further, the master film may be provided with a base material film, and a concave-convex resin layer formed on one surface of the base material film, and the third concave-convex structure may be formed on the concave-convex resin layer.

Further, the master film may be provided with an inorganic film that covers the third concave-convex structure.

Further, a release agent may be added to at least one of the master film and the optical film.

Further, the master film and the optical film may have a mutually different elastic modulus.

Further, at least one from among the first to third concave-convex structures may be formed by a cured light-curing resin.

Further, a spectral reflectance (for wavelengths from 350 nm to 800 nm) of the surface on which is formed the first concave-convex structure may be from 0.1% to 1.8%, and a spectral reflectance (for wavelengths from 350 nm to 800 nm) of the surface on which is formed the third concave-convex structure may be from 0.1% to 1.5%.

Further, the optical film may be formed in a solid cast.

Further, an adhesive layer that covers the second concave-convex structure may further be included.

Further, a thickness of the adhesive layer may be from 1 μm to 50 μm.

According to another aspect of the present invention, there is provided an optical film adhesive body, including: an adherend; and the above-mentioned optical film applied to the adherend via an adhesive layer.

According to another aspect of the present invention, there is provided a method for manufacturing the above-mentioned optical body, the method including: a step of preparing a first master, on a surface of which is formed a fourth concave-convex structure having a reverse shape of the third concave-convex structure; a step of preparing a second master, on a surface of which is formed a fifth concave-convex structure having a reverse shape of the second concave-convex structure; a step of producing the master film, using the first master as a transfer mold; and a step of forming the optical film on the master film, using the master film and the second master as a transfer mold.

Here, the method may include a step of transferring the fourth concave-convex structure of the first master to an uncured resin layer for the master film, thereby forming the third concave-convex structure on a surface of the uncured resin layer for the master film; a step of producing the master film by curing the uncured resin layer for the master film; a step of transferring the third concave-convex structure formed on the surface of the master film to one surface of an uncured resin layer for the optical film, thereby forming the first concave-convex structure on the one surface of the uncured resin layer for the optical film; a step of transferring the fifth concave-convex structure of the second master to an other surface of the uncured resin layer for the optical film, thereby forming the second concave-convex structure on the other surface of the uncured resin layer for the optical film; and a step of producing the optical film by curing the uncured resin layer for the optical film.

Further, a release agent may be added to at least one of the uncured resin layer for the master film and the uncured resin layer for the optical film.

Further, the uncured resin layer for the master film may be formed on a base material film.

Further, the method may further include a step of forming an inorganic film on the third concave-convex structure of the master film, and the third concave-convex structure on which is formed the inorganic film may be transferred to the one surface of the uncured resin layer for the optical film.

Further, at least one of the uncured resin layer for the master film and the uncured resin layer for the optical film may be made up of an uncured light-curing resin.

Further, an aspect ratio of the second concave-convex structure may be smaller than an aspect ratio of the first concave-convex structure, the aspect ratio of the first concave-convex structure may be a ratio of a height of the convexities constituting the first concave-convex structure and a diameter of a bottom face of the concavities constituting the first concave-convex structure, and the aspect ratio of the second concave-convex structure may be a ratio of a height of the convexities constituting the second concave-convex structure and a diameter of a bottom face of the concavities constituting the second concave-convex structure.

Further, a density of the concavities and convexities of the second concave-convex structure may be made smaller than a density of the concavities and convexities of the first concave-convex structure.

Further, a thickness of the optical film may be made to be from 1 μm to 60 μm.

Further, an average period of concavities and convexities of the fifth concave-convex structure may be less than or equal to visible light wavelengths.

Further, the master film and the optical film may be made to have mutually different values of elastic modulus.

Further, the method may further include a step of forming an adhesive layer on the second concave-convex structure formed on the optical film.

Further, a thickness of the adhesive layer may be made to be from 1 μm to 50 μm.

Advantageous Effects of Invention

According to the present invention, a master film may be used as a protective film for an optical film. For this reason, a concave-convex structure of the optical film (first concave-convex structure) may be protected without using a protective film. Furthermore, thickness may be gained due to the master film. For this reason, the optical film may be made thinner while still improving the handling properties of the optical film. Furthermore, the optical film includes a second concave-convex structure. For this reason, the adhesive strength between the optical film and the adhesive layer increases due to the anchor effect provided by the second concave-convex structure. Consequently, the optical film may be applied more firmly to the adherend. Furthermore, the second concave-convex structure reduces optical reflection caused by a difference in the refractive index between the adhesive layer and the optical film. As a result, the production of defects caused by such a difference in the refractive index (degraded reflectivity, ripple formation) is minimized.

BRIEF DESCRIPTION OF DRAWINGS

FIG. 4A is a cross-sectional view illustrating an example of an optical body usage method.

FIG. 4B is a cross-sectional view illustrating an example of an optical body usage method.

FIG. 8 is spectral reflection spectra of optical films of Examples 4 and 5, and Comparative Examples 1b and 4.

FIG. 9 is spectral transmittance curves indicating results of a light resistance test.

DESCRIPTION OF EMBODIMENTS

Figure 1:
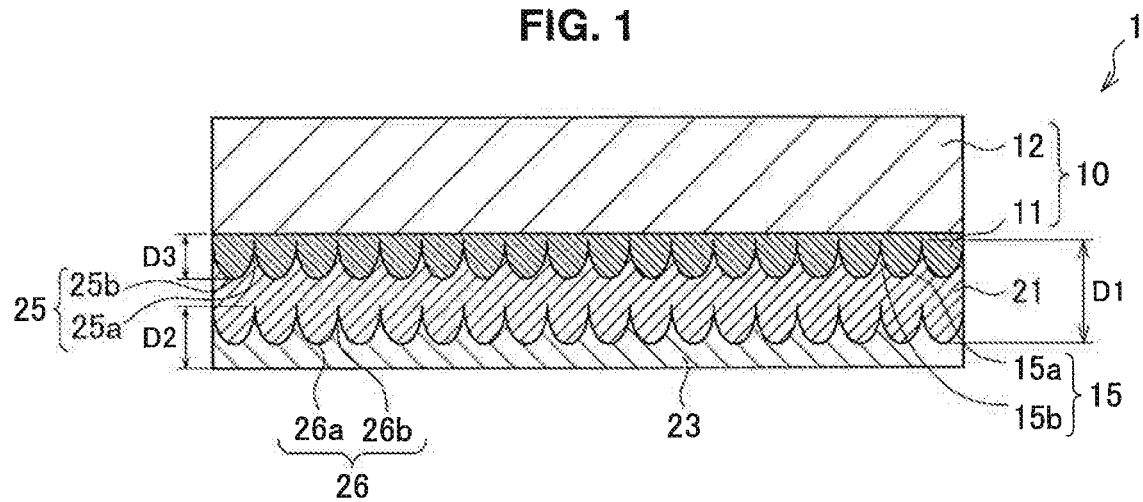
FIG. 1 is a cross-sectional view illustrating an example of an optical body according to the present embodiment.

Hereinafter, (a) preferred embodiment(s) of the present invention will be described in detail with reference to the appended drawings. In this specification and the appended drawings, structural elements that have substantially the same function and structure are denoted with the same reference numerals, and repeated explanation of these structural elements is omitted.

<1. Overall Configuration of Optical Body>

First, an overall configuration of an optical body 1 according to the present embodiment will be described on the basis of FIG. 1. The optical body 1 is provided with a master film 10, an optical film 21, and an adhesive layer 23. Note that the adhesive layer 23 may also be absent (see the second usage method described later).

The master film 10 is a film that protects the optical film 21. Also, by making the master film 10 thick, it is possible to improve the handling properties of the optical body 1 while also making the optical film 21 thinner. Furthermore, the master film 10 is usable as a protective film, and thus it is not necessary to prepare a separate protective film to protect the optical film 21. The master film 10 is provided with a third concave-convex structure 15 formed on the surface thereof that faces the optical film 21. The average period of the concavities and convexities of the third concave-convex structure 15 is less than or equal to the visible light wavelengths.

Meanwhile, the optical film 21 is provided with a first concave-convex structure 25 formed on the surface (one surface) thereof that faces the master film 10. The first concave-convex structure 25 has the reverse shape of the third concave-convex structure 15, and engages with the third concave-convex structure 15. In other words, first convexities 25a constituting the first concave-convex structure 25 fit into third concavities 15b constituting the third concave-convex structure 15. Likewise, third convexities 15a constituting the third concave-convex structure 15 fits into first concavities 25b constituting the first concave-convex structure 25. Also, the average period of the concavities and convexities of the first concave-convex structure 25 is less than or equal to the visible light wavelengths. Consequently, not only the optical film 21 but also the master film 10 becomes usable as an anti-reflective film. Also, the master film 10 and the optical film 21 are separable from each other.

In addition, the optical film 21 is provided with a second concave-convex structure 26 formed on the surface (other surface) thereof on the opposite side of the surface that faces the master film 10. The average period of the concavities and convexities of the second concave-convex structure 26 is not necessarily required to be less than or equal to the visible light wavelengths, but is preferably less than or equal to the visible light wavelengths. The adhesive layer 23 is provided on top of the second concave-convex structure 26, and covers the second concave-convex structure 26. The adhesive layer 23 is used to apply the optical film 21 to the adherend. In the present embodiment, the adhesive strength between the adhesive layer 23 and the optical film 21 may be increased due to the anchor effect provided by the second concave-convex structure 26. Consequently, the optical film 21 may be applied more firmly to the adherend. Furthermore, the second concave-convex structure 26 reduces optical reflection caused by a difference in the refractive index between the adhesive layer and the optical film 21. As a result, the production of defects caused by such a difference in the refractive index (degraded reflectivity, ripple formation) are minimized.

<2. Configuration of Master Film>

Next, the configuration of the master film 10 will be described on the basis of FIGS. 1 to 2B. The master film 10 is provided with a base material film 12, and a concave-convex resin layer 11 formed on one surface of the base material film 12. Note that the base material film 12 and the concave-convex resin layer 11 may also be made into a solid cast. For example, by making the base material film 12 be a thermoplastic resin film, the base material film 12 and the concave-convex resin layer 11 may be made into a solid cast. Details will be described later.

The third concave-convex structure 15 is formed on the surface of the concave-convex resin layer 11 (that is, the surface of the master film 10). The third concave-convex structure 15 includes multiple third convexities 15a, which are convex in the film-thickness direction of the master film 10, and multiple third concavities 15b, which are concave in the film-thickness direction of the master film 10. The third convexities 15a and the third concavities 15b are arranged periodically on the master film 10. For example, in the example of FIG. 2A, the third convexities 15a and the third concavities 15b are arranged in a staggered lattice. Obviously, the third convexities 15a and the third concavities 15b may also be arranged in a different arrangement pattern. For example, the third convexities 15a and the third concavities 15b may also be arranged in a square lattice. Additionally, the third convexities 15a and the third concavities 15b may also be arranged randomly. The shapes of the third convexities 15a and the third concavities 15b are not particularly limited. The shapes of the third convexities 15a and the third concavities 15b may also be bullet-shaped, conical, columnar, or needle-shaped. Note that the shape of the third concavities 15b means the shape formed by the inner wall faces of the third concavities 15b.

The average period of the concavities and convexities of the third concave-convex structure 15 is less than or equal to the visible light wavelengths (for example, less than or equal to 830 nm), preferably more than or equal to 100 nm and less than or equal to 350 nm, more preferably more than or equal to 150 nm and less than or equal to 280 nm, and further more preferably more than or equal to 153 nm and less than or equal to 270 nm. Consequently, the third concave-convex structure 15 has what is called a moth-eye structure. Herein, if the average period is less than 100 nm, there is a possibility that the formation of the third concave-convex structure 15 may become difficult, which is not preferable. Also, if the average period exceeds 350 nm, there is a possibility that a diffraction phenomenon of visible light may occur, which is not preferable.

The average period of the third concave-convex structure 15 is the arithmetic mean value of the distance between adjacent third convexities 15a and between adjacent third concavities 15b. Note that the third concave-convex structure 15 is observable with a device such as a scanning electronic microscope (SEM) or a cross-section tunneling electronic microscope (cross-section TEM), for example. Also, a method of calculating the average period is as follows, for example. Namely, multiple pairs of adjacent third concavities 15b and pairs of adjacent third convexities 15a are picked up, and the distance therebetween (pitch) is measured. Note that the distance between the third convexities 15a is the distance between the apices of the third convexities 15a, for example. Also, the distance between the third concavities 15b is the distance between the center points of the third concavities 15b, for example. Subsequently, the average period may be calculated by taking the arithmetic mean of the measured values. The average period of other concave-convex structures is measurable by a similar method.

Figure 2A:
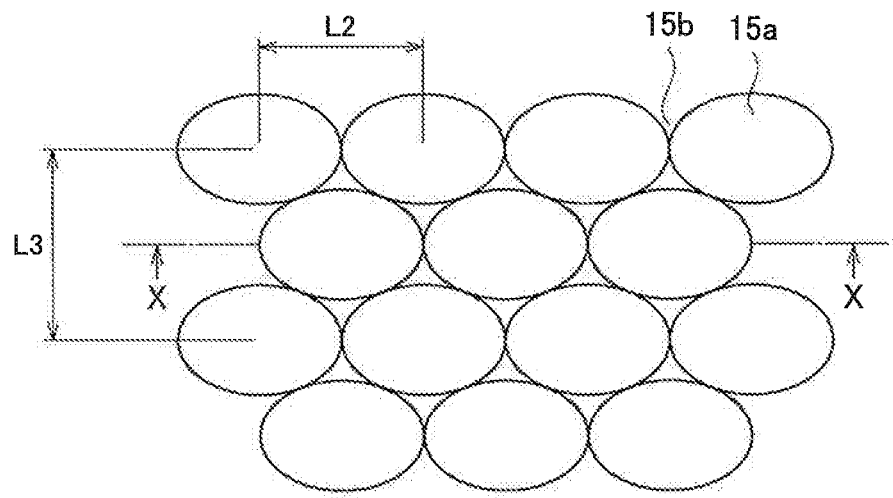
FIG. 2A is a plan view illustrating an example of a concave-convex structure (third concave-convex structure) formed on a surface of a master film.

Note that when the third convexities 15a and the third concavities 15b are arranged periodically on the master film 10, the pitch between the third convexities 15a (or the third concavities 15b) is categorized as the dot pitch L2 and the track pitch L3, for example. In other words, when the third convexities 15a and the third concavities 15b are arranged periodically on the master film 10, the third concave-convex structure 15 may be considered to be an arrangement of parallel tracks (rows) made up of multiple third convexities 15a and third concavities 15b. In the example of FIG. 2A, the tracks extend in the horizontal direction, and are lined up in the vertical direction. Also, the third convexities 15a (or the third concavities 15b) arranged between adjacent tracks are offset from each other in the track length direction by half the length of the third convexities 15a (or the third concavities 15b). The dot pitch L2 is the pitch between the third convexities 15a (or the third concavities 15b) arranged in the track length direction. The track pitch L3 is the pitch between the third convexities 15a (or the third concavities 15b) arranged in the track arrangement direction (the vertical direction in FIG. 2A). The pitch of other concave-convex structures is categorized by a similar method.

Figure 2B:
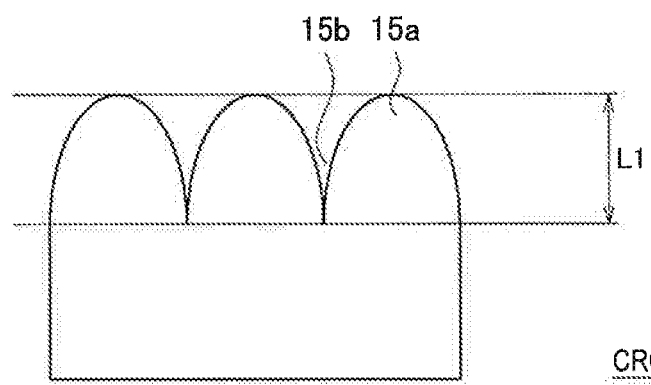
FIG. 2B is an XX cross-sectional view illustrating an example of a concave-convex structure formed on a surface of a master film.

Also, the height of the third convexities 15a (depth of the third concavities 15b) L1 illustrated in FIG. 2B is not particularly limited, being preferably more than or equal to 150 nm and less than or equal to 300 nm, more preferably more than or equal to 190 nm and less than or equal to 300 nm, and still more preferably more than or equal to 190 nm and less than or equal to 230 nm.

By having the average period and the height of the third concave-convex structure 15 take values in the above ranges, the anti-reflective properties of the master film 10 may be improved further. Specifically, the spectral reflectance of the third concave-convex structure 15 (spectral specular reflectance for wavelengths from 350 nm to 800 nm) may be set from 0.1% to 1.8%, preferably from 0.1% to 1.5%. Also, in the case of forming the third concave-convex structure 15 by a transfer method as described later, the master film 10 may be released easily from the first master 30 after the transfer. Note that the height of the third convexities 15a may also differ among the individual third convexities 15a.

The concave-convex resin layer 11 is made up of a cured curing resin. The cured curing resin is preferably transparent. The curing resin includes a polymerizable compound and a curing initiator. The polymerizable compound is a resin that is cured by the curing initiator. The polymerizable compound may be a compound such as a polymerizable epoxy compound or a polymerizable acrylic compound, for example. A polymerizable epoxy compound is a monomer, oligomer, or prepolymer having one or multiple epoxy groups in the molecule. Examples of polymerizable epoxy compounds include various bisphenol epoxy resins (such as bisphenol A and F), novolac epoxy resin, various modified epoxy resins such as rubber and urethane, naphthalene epoxy resin, biphenyl epoxy resin, phenol novolac epoxy resin, stilbene epoxy resin, triphenol methane epoxy resin, dicyclopentadiene epoxy resin, triphenyl methane epoxy resin, and prepolymers of the above.

A polymerizable acrylic compound is a monomer, oligomer, or prepolymer having one or multiple acrylic groups in the molecule. Herein, monomers are further classified into monofunctional monomers having one acrylic group in the molecule, bifunctional monomers having two acrylic groups in the molecule, and multifunctional monomers having three or more acrylic groups in the molecule.

Examples of "monofunctional monomers" include carboxylic acids (acrylic acids), hydroxy monomers (2-hydroxyethyl acrylate, 2-hydroxypropyl acrylate, 4-hydroxybutyl acrylate), alkyl or alicyclic monomers (isobutyl acrylate, t-butyl acrylate, isooctyl acrylate, lauryl acrylate, stearyl acrylate, isobornyl acrylate, cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylamino ethyl acrylate, N,N-dimethylamino propyl acrylamide, N,N-dimethyl acrylamide, acryloyl morpholine, N-isopropyl acrylamide, N,N-diethyl acrylamide, N-vinyl pyrrolidone, 2-(perfluorooctyl)ethyl acrylate, 3-perfluorohexyl-2-hydroxypropyl acrylate, 3-perfluorooctyl-2-hydroxypropyl-acrylate, 2-(perfluorodecyl)ethyl-acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of "bifunctional monomers" include tri(propylene glycol) di-acrylate, trimethylolpropane-diaryl ether, and urethane acrylate.

Examples of "multifunctional monomers" include trimethylolpropane tri-acrylate, dipentaerythritol penta- and hexa-acrylate, and ditrimethylolpropane tetra-acylate.

Examples other than the polymerizable acrylic compounds listed above include acrylmorpholine, glycerol acrylate, polyether acrylates, N-vinylformamide, N-vinylcaprolactone, ethoxy diethylene glycol acrylate, methoxy triethylene glycol acrylate, polyethylene glycol acrylate, ethoxylated trimethylolpropane tri-acrylate, ethoxylated bisphenol A di-acrylate, aliphatic urethane oligomers, and polyester oligomers. From the perspective of transparency and separability from the optical film 21 of the master film 10, the polymerizable compound preferably is a polymerizable acrylic compound.

The curing initiator is a material that cures the curing resin. Examples of the curing initiator include thermal curing initiators and light-curing initiators, for example. The curing initiator may also be one that cures by some kind of energy beam other than heat or light (for example, an electron beam) or the like. In the case in which the curing initiator is a thermal curing initiator, the curing resin is a thermosetting resin, whereas in the case in which the curing initiator is a light-curing initiator, the curing resin is a light-curing resin.

Herein, from the perspective of transparency and separability from the optical film 21 of the master film 10, the curing initiator preferably is an ultraviolet-curing initiator. Consequently, the curing resin preferably is an ultraviolet-curing acrylic resin. An ultraviolet-curing initiator is a type of light-curing initiator. Examples of ultraviolet-curing initiators include 2,2-dimethoxy-1,2-diphenylethane-1-one, 1-hydroxy-cyclohexyl phenyl ketone, and 2-hydroxy-2-methyl-1-phenyl propane-1-one.

Additionally, additives may also be added to the concave-convex resin layer 11 depending on the purpose of the optical body 1. Examples of additives include inorganic fillers, organic fillers, leveling agents, surface conditioners, and antifoaming agents. Note that examples of types of inorganic fillers include metallic oxide particles such as $SiO_2$, $TiO_2$, $ZrO_2$, $SnO_2$, and $Al_2O_3$. Furthermore, a release agent or the like may also be added to the concave-convex resin layer 11 to enable easy separation of the master film 10 and the optical film 21. Details will be described later.

The thickness of the concave-convex resin layer 11 (in other words, the distance D3 from the surface on the base material film 12 side of the concave-convex resin layer 11 to the apices of the third convexities 15a) is preferably from 1 μm to 60 μm from the perspective of manufacturing consistency of the third concave-convex structure 15. Note that the thickness of the concave-convex resin layer 11 is measurable with the Mitutoyo Litematic VL-50S thickness measuring unit, for example. Specifically, the thickness of the base material film 12 before the formation of the concave-convex resin layer 11, and the thickness of the base material film 12 after the formation of the concave-convex resin layer 11, or in other words the master film 10, are measured, and the difference between the two is treated as the thickness of the concave-convex resin layer 11. Note that the thickness of the concave-convex resin layer 11 may vary in some cases depending on the measurement point. In this case, it is sufficient to take the arithmetic mean of the values at multiple measurement points as the thickness D3 of the concave-convex resin layer 11.

The type of the base material film 12 is not particularly limited, but in the case of using the master film 10 as an anti-reflective film, a transparent and tear-resistant film is preferable. Examples of the base material film 12 include polyethylene terephthalate (PET) film and triacetyl cellulose (TAC) film. In the case of using the master film 10 as an anti-reflective film, the base material film 12 is preferably made of a highly transparent material.

In the present embodiment, the master film 10 is able to protect the first concave-convex structure 25 of the optical film 21. Furthermore, by making the master film 10 thick, it is possible to improve the handling properties of the optical body 1. In other words, in the present embodiment, since the handling properties of the optical body 1 may be ensured by the master film 10, the optical film 21 may be made thinner. Making the master film 10 thicker is achieved by making the base material film 12 thicker, for example. It is sufficient to adjust the thickness of the base material film 12 as appropriate according to the purpose of the optical body 1, or in other words the handling properties demanded of the optical body 1. The thickness of the base material film 12 may be from 50 μm to 125 μm, for example.

<3. Configuration of Optical Film>

Next, the configuration of the optical film 21 will be described on the basis of FIG. 1. The optical film 21 is provided with the first concave-convex structure 25 formed on one surface thereof (the surface on the side that faces the master film 10), and the second concave-convex structure 26 formed on another surface thereof (the surface on the side that faces the adhesive layer 23).

The first concave-convex structure 25 includes multiple first convexities 25a, which are convex in the film-thickness direction of the optical film 21, and multiple first concavities 25b, which are concave in the film-thickness direction of the optical film 21. The first concave-convex structure 25 has the reverse shape of the third concave-convex structure 15. Consequently, the average period of the first concave-convex structure 25 approximately matches the average period of the third concave-convex structure 15. In other words, in the first concave-convex structure 25, the average period of the concavities and convexities likewise is less than or equal to the visible light wavelengths.

Specifically, the average period of the concavities and convexities of the first concave-convex structure 25 is less than or equal to the visible light wavelengths (for example, less than or equal to 830 nm), preferably more than or equal to 100 nm and less than or equal to 350 nm, more preferably more than or equal to 150 nm and less than or equal to 280 nm, and more preferably more than or equal to 153 nm and less than or equal to 270 nm. The method of computing the average period is similar to that of the third concave-convex structure 15 described earlier. Consequently, the first concave-convex structure 25 has what is called a moth-eye structure. Also, the height of the first convexities 25a is not particularly limited, being preferably more than or equal to 150 nm and less than or equal to 300 nm, more preferably more than or equal to 190 nm and less than or equal to 300 nm, and still more preferably more than or equal to 190 nm and less than or equal to 230 nm.

By having the average period and the height of the first concave-convex structure 25 take values in the above ranges, the anti-reflective properties of the optical film 21 may be improved further. Specifically, the spectral reflectance (for wavelengths from 350 nm to 800 nm) of the first concave-convex structure 25 may be set from 0.1% to 1.8%. Furthermore, oscillations in the spectral reflection spectrum are reduced. In other words, ripples are reduced.

The second concave-convex structure 26 includes multiple second convexities 26a, which are convex in the film-thickness direction of the optical film 21, and multiple second concavities 26b, which are concave in the film-thickness direction of the optical film 21. The second concave-convex structure 26 is able to increase the adhesive strength between the optical film 21 and the adhesive layer 23 due to an anchor effect. Note that the average period of the concavities and convexities of the second concave-convex structure 26 is not necessarily required to be less than or equal to the visible light wavelengths. However, from the perspective of improved anti-reflective properties of the optical film 21, the average period of the concavities and convexities of the second concave-convex structure 26 is preferably less than or equal to the visible light wavelengths. Furthermore, from the perspective of suppressing unwanted diffracted light, the average period of the concavities and convexities of the second concave-convex structure 26 is preferably comparable with the average period of the concavities and convexities of the first concave-convex structure 25. Also, the height of the second convexities 26a is preferably comparable with the height of the first convexities 25a. In other words, the second concave-convex structure 26 preferably has a shape that is comparable with the first concave-convex structure 25.

Herein, the second concave-convex structure 26 is formed by using a second master 40 described later as a transfer mold. Consequently, if the peeling strength of the second master 40 (in other words, the anchor effect on the second master 40) is excessively higher than the peeling strength of the master film 10 (in other words, the anchor effect on the master film 10), the following problem may occur. Namely, when peeling the optical film 21 away from the second master 40, there is a possibility that instead of the second master 40 peeling away from the optical film 21, the master film 10 may peel away from the optical film 21. For this reason, the peeling strength of the second master 40 is preferably not set excessively high. Specifically, the aspect ratio of the second concave-convex structure 26 is preferably smaller than the aspect ratio of the first concave-convex structure 25. Herein, the aspect ratio of the first concave-convex structure 25 is the ratio (height/diameter) of the height of the first convexities 25a and the diameter of the bottom face of the first concavities 25b. Herein, the diameter of the first concavities 25b specifically may be taken to be the pitch between the first concavities 25b. Herein, the pitch of the first concavities 25b is categorized as a track pitch and a dot pitch, as described earlier. Consequently, the diameter of the first concavities 25b may be taken to be the arithmetic mean value of the track pitch and the dot pitch. Meanwhile, the aspect ratio of the second concave-convex structure 26 is the ratio (height/diameter) of the height of the second convexities 25a and the diameter of the bottom face of the second concavities 26b. Note that in the case of measuring the aspect ratio at multiple measurement points, there is a possibility that the measured values may vary. In this case, it is sufficient to use the arithmetic mean of the measured values.

Note that another method for making the master film 10 less likely to peel away from the optical film 21 is to make the density of the concavities and convexities of the second concave-convex structure 26 less than the density of the concavities and convexities of the first concave-convex structure 25. Herein, the density of the concavities and convexities of the first concave-convex structure 25 means the number of first convexities 25a (or first concavities 25b) formed per unit area. Also, the density of the second concave-convex structure 26 means the number of second convexities 26a (or second concavities 26b) formed per unit area. It is sufficient to carry out at least one of the above method of adjusting the aspect ratios and the method of adjusting the densities of the concavities and convexities.

The thickness of the optical film 21 (specifically, the distance D1 from the apices of the first convexities 25a to the apices of the second convexities 26a) is not particularly limited, but is preferably from 1 μm to 60 μm from the perspective of manufacturing consistency of the first concave-convex structure 25 and the second concave-convex structure 26. Note that the thickness of the optical film 21 is measurable with the Mitutoyo Litematic VL-50S thickness measuring unit, for example. The thickness of the optical film 21 may vary in some cases depending on the measurement point. In this case, it is sufficient to take the arithmetic mean of the values at multiple measurement points as the thickness of the optical film 21.

However, in the present embodiment, the optical body 1 is able to gain thickness due to the master film 10. Consequently, the optical film 21 may be made thinner while also ensuring the handling properties of the optical body 1. For example, the thickness of the optical film 21 may be from 1 μm to 10 μm, and more preferably from 1 μm to 6 μm. Thus, in the present embodiment, the optical film 21 may be made thinner. Consequently, when manufacturing the optical film 21, it is not necessary to prepare a separate base material film for the optical film. In other words, the optical film 21 is preferably made in a solid cast. Obviously, a base material film for the optical film may also be prepared, and the first concave-convex structure 25 and the second concave-convex structure 26 may be formed on this base material film. Note that even in this case, the first concave-convex structure 25 may be formed using the master film 10, and the second concave-convex structure 26 may be formed using the second master 40. Alternatively, the first concave-convex structure 25 may be formed on one surface of the optical film 21 using the master film 10. Subsequently, a concave-convex resin layer having the second concave-convex structure 26 may be prepared and applied onto the optical film 21. In this case, the adjustment of the aspect ratios described above is not strictly necessary. However, from the perspective of making the optical film 21 thinner and simplifying the manufacturing steps, the optical film 21 is preferably made in a solid cast. It is sufficient for the optical film 21 to be made of a curing resin or the like similar to the concave-convex resin layer 11.

<3-1. Configuration for Enabling Separability of Master Film and Optical Film>

The master film 10 is separable from the optical film 21. In more detail, the concave-convex resin layer 11 of the master film 10 and the optical film 21 are separable from each other.

The method by which the concave-convex resin layer 11 of the master film 10 and the optical film 21 are separable is not particularly limited, and may be the following methods, for example. The following methods may be conducted alone, or multiple methods may be used jointly. For example, a release agent may be added to at least one of the concave-convex resin layer 11 and the optical film 21. Herein, the type of release agent is not particularly limited, and may be a silicone-type or fluorine-type release agent or the like.

Additionally, the elastic modulus (Young's modulus) of the concave-convex resin layer 11 may be set to a different value than the elastic modulus of the optical film 21. Note that the difference between the elastic modulus of the concave-convex resin layer 11 and the elastic modulus of the optical film 21 is preferably from 400 MPa to 1200 MPa. For example, the elastic modulus of the optical film 21 may be set from 300 MPa to 700 MPa, while the elastic modulus of the concave-convex resin layer 11 may be set from 700 MPa to 1500 MPa. At this point, the method of adjusting the elastic modulus of the concave-convex resin layer 11 and the optical film 21 may be, for example, mixing into the uncured curing resin a modified diacrylate with few functional groups, or a glycol resin or the like having a low modulus after curing. Herein, the glycol resin having a low modulus after curing may be polyethylene glycol diacrylate or the like, for example.

In addition, an inorganic film (for example, an inorganic film 16 illustrated in FIG. 3L) may be formed on the surface of the third concave-convex structure 15. Herein, the material constituting the inorganic film may be silicon oxide, silicon, tungsten oxide, ITO, or the like. The thickness of the inorganic film is not particularly limited, and may be approximately from several nanometers to 20 nm, for example. The inorganic film is formed on the surface of the third concave-convex structure 15 by sputtering or the like, for example. If an inorganic film is formed on the surface of the third concave-convex structure 15, the processes described above may also be omitted.

<4. Configuration of Adhesive Layer>

The adhesive layer 23 is formed on top of the second concave-convex structure 26. For this reason, in the present embodiment, the adhesive strength between the optical film 21 and the adhesive layer 23 may be increased due to the anchor effect provided by the second concave-convex structure 26. As a result, the optical film 21 may be applied firmly to the adherend.

The material constituting the adhesive layer 23 is not particularly limited, and may be selected appropriately according to factors such as the purpose of the optical body 1. For example, the adhesive layer 23 is made up of a curing adhesive agent such as a light-curing adhesive agent or a thermosetting adhesive agent, or a pressure-sensitive adhesive agent (adhesive agent). More specifically, the adhesive layer 23 is preferably formed from an optically clear adhesive agent with high total light transmittance and low haze. For example, the adhesive layer 23 is preferably made up of optically clear adhesive (OCA) tape such as a non-carrier acrylic adhesive film or the like. Additionally, the adhesive layer 23 may also be made up of a light-resistant and heat-resistant curing adhesive agent. In this case, the light resistance and heat resistance of the optical body 1 may be improved. Also, preferably, the refractive index of the adhesive layer 23 approximately matches the refractive index of the adherend. Consequently, when the optical film 21 is made to adhere to the adherend, the reflectance on the optical film side may be reduced significantly. Also, before applying the optical film 21 to the adherend, it is preferable to cover the adhesive layer 23 with a protective film, from the perspective of protecting the adhesive layer 23.

The thickness of the adhesive layer 23 (that is, the distance D2 from the bottom face of the second concavities 26b to the surface of the adhesive layer 23) is not particularly limited, but is preferably from 1 µm to 50 µm, from the perspective of the handling properties of the optical body 1 during application work, and the conformability of the optical body 1 to the surface shape of the adherend (the object to which the optical body 1 is applied).

Therefore, in the present embodiment, the thickness of the optical film 21 may be set from 1 µm to 60 µm, more preferably from 1 µm to 10 µm, and the thickness of the adhesive layer 23 may be set from 1 µm to 50 µm. Consequently, the total thickness of the optical film 21 and the adhesive layer 23 may be set from 2 µm to 110 µm, more preferably from 2 µm to 60 µm.

Figure 10A:
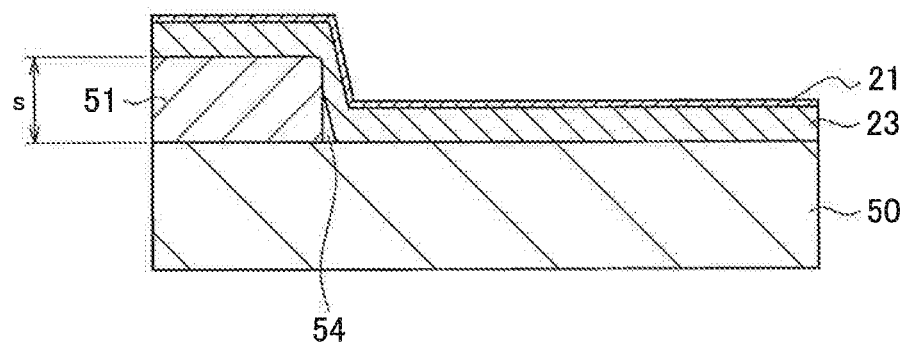
FIG. 10A is a cross-sectional view of a touch panel to which is applied an optical film according to the present embodiment.
Figure 10B:
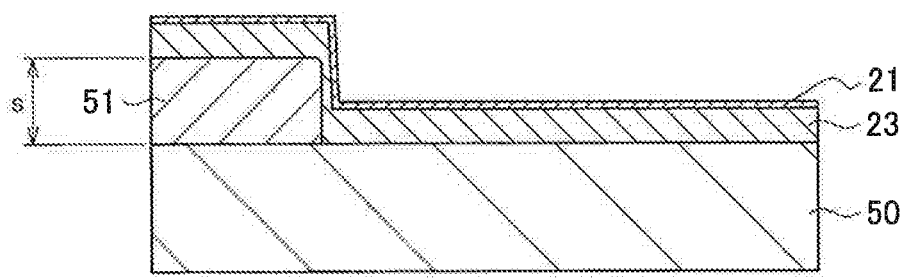
FIG. 10B is a cross-sectional view illustrating a state after performing an autoclaving process on the optical film illustrated in FIG. 10A.
Figure 11:
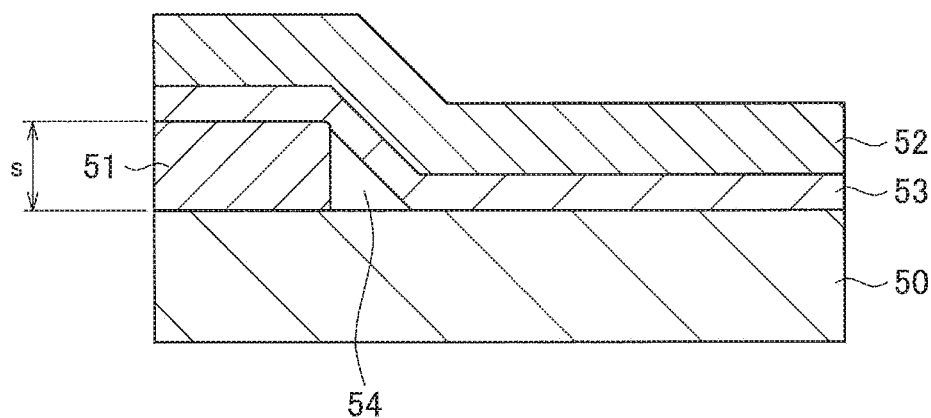
FIG. 11 is a cross-sectional view of a touch panel to which is applied an anti-reflective film of the related art.

Consequently, the optical film adhesive body with the optical film 21 applied thereto may be made thinner. Also, the optical film 21 is able to adequately conform to the surface shape of the adherend. For example, as illustrated in FIG. 10A, in the case of using the adhesive layer 23 with a thickness of 20 µm to apply the optical film 21 with a thickness of 5 µm to a touch panel 50 having a frame body 51 with a height s of 50 µm, the optical film 21 may be applied to the surface of the touch panel 50 and the frame body 51, while forming almost no air gap 54 at the perimeter of the frame body 51. Furthermore, after applying the optical film 21, an autoclaving process or the like may also be performed. In this case, as illustrated in FIG. 10B, the air gap 54 may be reduced even further. Consequently, the optical film 21 may be applied favorably to adherends having a variety of surface shapes. In other words, in addition to a flat, planar object such as a liquid crystal display, the optical film 21 may also be applied favorably to a transparent substrate having a step, such as a touch panel having a bezel part, for example, a wearable terminal, a head-mounted display, a protective plate for an in-vehicle display having a curved surface, a show window, or the like.

<5. Configuration of First Master>

Figure 3A:
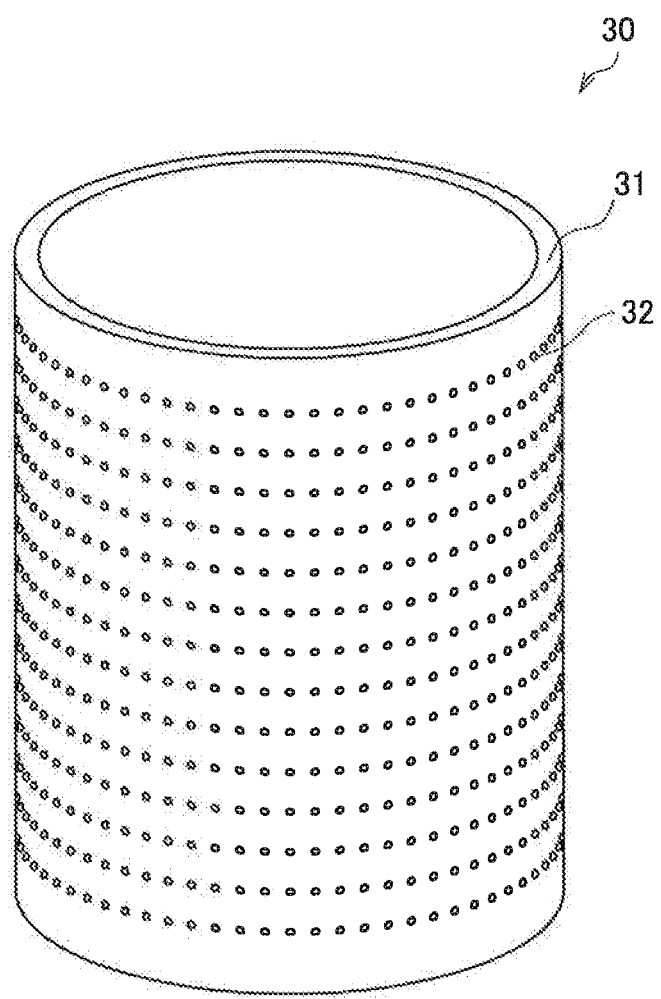
FIG. 3A is a perspective view illustrating an example appearance of a master (first master) on the circumferential face of which is formed a concave-convex structure (fourth concave-convex structure).

The third concave-convex structure 15 is produced using the first master 30 illustrated in FIG. 3A, for example. Accordingly, the configuration of the first master 30 will be described next. The first master 30 is a master used in a nanoimprint method, and has a hollow round cylindrical shape, for example. The first master 30 may also have a round columnar shape, or another shape (for example, a planar shape). However, if the first master 30 has a round columnar or hollow round cylindrical shape, a fourth concave-convex structure 32 of the first master 30 may be transferred seamlessly to a resin base material or the like with a roll-to-roll method. Consequently, the master film 10 with the fourth concave-convex structure 32 of the first master 30 transferred thereonto may be produced with high production efficiency. From such a perspective, the shape of the first master 30 is preferably a hollow round cylindrical shape or a round columnar shape.

The first master 30 is provided with a master base material 31, and a fourth concave-convex structure 32 formed on the surface of the master base material 31. The master base material 31 is a glass body, for example, and specifically is formed from quartz glass. However, the master base material 31 is not particularly limited insofar as the $SiO_2$ purity is high, and may also be formed from a material such as fused quartz glass or synthetic quartz glass. The shape of the master base material 31 is a hollow round cylindrical shape, but may also be a round columnar shape, or some other shape. However, as described above, the master base material 31 preferably has a hollow round cylindrical shape or a round columnar shape. The fourth concave-convex structure 32 has the reverse shape of the third concave-convex structure 15.

<6. Configuration of Second Master>

Figure 3B:
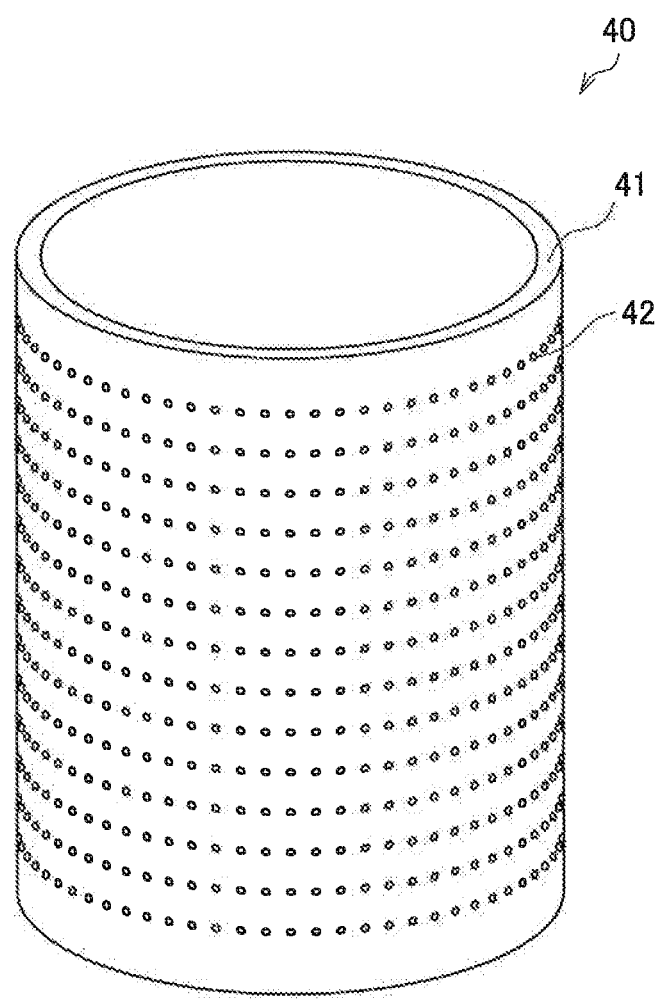
FIG. 3B is a perspective view illustrating an example appearance of a master (second master) on the circumferential face of which is formed a concave-convex structure (fifth concave-convex structure).

The second concave-convex structure 26 is produced using the second master 40 illustrated in FIG. 3B, for example. Accordingly, the configuration of the second master 40 will be described next. The second master 40 is a master used in a nanoimprint method, and has a hollow round cylindrical shape, for example. The second master 40 may also have a round columnar shape, or another shape (for example, a planar shape). However, if the second master 40 has a round columnar or hollow round cylindrical shape, a fifth concave-convex structure 42 of the second master 40 may be transferred seamlessly to a resin base material or the like with a roll-to-roll method. Consequently, the optical film 21 with the fifth concave-convex structure 42 of the second master 40 transferred thereonto may be produced with high production efficiency. From such a perspective, the shape of the second master 40 is preferably a hollow round cylindrical shape or a round columnar shape.

The second master 40 is provided with a master base material 41, and a fifth concave-convex structure 42 formed on the surface of the master base material 41. The master base material 41 is a glass body, for example, and specifically is formed from quartz glass. However, the master base material 41 is not particularly limited insofar as the $SiO_2$ purity is high, and may also be formed from a material such as fused quartz glass or synthetic quartz glass. The shape of the master base material 41 is a hollow round cylindrical shape, but may also be a round columnar shape, or some other shape. However, as described above, the master base material 41 preferably has a hollow round cylindrical shape or a round columnar shape. The fifth concave-convex structure 42 has the reverse shape of the second concave-convex structure 26.

<6. Method of Manufacturing Master>

Next, a method of manufacturing the first master 30 will be described. Note that the second master 40 may also be manufactured by a process similar to the first master 30. First, a base material resist layer is formed (deposited) on the master base material 31. At this point, the resist constituting the base material resist layer is not particularly limited, and may be either an organic resist or an inorganic resist. Examples of organic resists include novolac-type resist and chemically-amplified resist. Also, examples of inorganic resists include metallic oxides including one or multiple types of transition metals such as tungsten (W) or molybdenum (Mo). However, in order to conduct thermal reaction lithography, the base material resist layer preferably is formed with a thermo-reactive resist including a metallic oxide.

In the case of using an organic resist, the base material resist layer may be formed on the master base material 31 by using a process such as spin coating, slit coating, dip coating, spray coating, or screen printing. Also, in the case of using an inorganic resist for the base material resist layer, the base material resist layer may be formed by sputtering.

Next, by exposing part of the base material resist layer with an exposure device 200 (see FIG. 3I), a latent image is formed on the base material resist layer. Specifically, the exposure device 200 modulates laser light 200A, and irradiates the base material resist layer with the laser light 200A. Consequently, part of the base material resist layer irradiated by the laser light 200A denatures, and thus a latent image corresponding to the fourth concave-convex structure 32 may be formed in the base material resist layer. The latent image is formed in the base material resist layer at an average period less than or equal to the visible light wavelengths.

Next, by dripping a developing solution onto the base material resist layer in which is formed the latent image, the base material resist layer is developed. As a result, a concave-convex structure is formed in the base material resist layer. Subsequently, by etching the master base material 31 and the base material resist layer using the base material resist layer as a mask, the fourth concave-convex structure 32 is formed on the master base material 31. Note that although the etching method is not particularly limited, dry etching that is vertically anisotropic is preferable. For example, reactive ion etching (RIE) is preferable. By the above steps, the first master 30 is produced. Note that anodic porous alumina obtained by the anodic oxidation of aluminum may also be used as the master. Anodic porous alumina is disclosed in WO 2006/059686, for example.

<7. Configuration of Exposure Device>

Next, the configuration of the exposure device 200 will be described on the basis of FIG. 3I. The exposure device 200 is a device that exposes the base material resist layer. The exposure device 200 is provided with a laser light source 201, a first mirror 203, a photodiode (PD) 205, a deflecting optical system, a control mechanism 230, a second mirror 213, a movable optical table 220, a spindle motor 225, and a turntable 227. Also, the master base material 31 is placed on the turntable 227 and able to be rotated.

The laser light source 201 is a light source that emits laser light 200A, and is a device such as a solid-state laser or a semiconductor laser, for example. The wavelength of the laser light 200A emitted by the laser light source 201 is not particularly limited, but may be a wavelength in the blue light band from 400 nm to 500 nm, for example. Also, it is sufficient for the spot diameter of the laser light 200A (the diameter of the spot radiated onto the resist layer) to be smaller than the diameter of the open face of a concavity of the fourth concave-convex structure 32, such as approximately 200 nm, for example. The laser light 200A emitted from the laser light source 201 is controlled by the control mechanism 230.

The laser light 200A emitted from the laser light source 201 advances directly in a collimated beam, reflects off the first mirror 203, and is guided to the deflecting optical system.

The first mirror 203 is made up of a polarizing beam splitter, and has a function of reflecting one polarized component, and transmitting the other polarized component. The polarized component transmitted through the first mirror 203 is sensed by the photodiode 205 and photoelectrically converted. Also, the photodetection signal photoelectrically converted by the photodiode 205 is input into the laser light source 201, and the laser light source 201 conducts phase modulation of the laser light 200A on the basis of the input photodetection signal.

In addition, the deflecting optical system is provided with a condenser lens 207, an electro-optic deflector (EOD) 209, and a collimator lens 211.

In the deflecting optical system, the laser light 200A is condensed onto the electro-optic deflector 209 by the condenser lens 207. The electro-optic deflector 209 is an element capable of controlling the radiation position of the laser light 200A. With the electro-optic deflector 209, the exposure device 200 is also able to vary the radiation position of the laser light 200A guided onto the movable optical table 220. After the radiation position is adjusted by the electro-optic deflector 209, the laser light 200A is converted back into a collimated beam by the collimator lens 211. The laser light 200A exiting the deflecting optical system is reflected by the second mirror 213, and guided level with and parallel to the movable optical table 220.

The movable optical table 220 is provided with a beam expander (BEX) 221 and an objective lens 223. The laser light 200A guided to the movable optical table 220 is shaped into a desired beam shape by the beam expander 221, and then radiated via the objective lens 223 onto the base material resist layer formed on the master base material 31. In addition, the movable optical table 220 moves by one feed pitch (track pitch) in the direction of the arrow R (feed pitch direction) every time the master base material 31 undergoes one rotation. The master base material 31 is placed on the turntable 227. The spindle motor 225 causes the turntable 227 to rotate, thereby causing the master base material 31 to rotate.

In addition, the control mechanism 230 is provided with a formatter 231 and a driver 233, and controls the radiation of the laser light 200A. The formatter 231 generates a modulation signal that controls the radiation of the laser light 200A, and the driver 233 controls the laser light source 201 on the basis of the modulation signal generated by the formatter 231. As a result, the irradiation of the master base material 31 by the laser light 200A is controlled.

The formatter 231 generates a control signal for irradiating the base material resist layer with the laser light 200A, on the basis of an input image depicting an arbitrary pattern to draw on the base material resist layer. Specifically, first, the formatter 231 acquires an input image depicting an arbitrary pattern to draw on the base material resist layer. The input image is an image corresponding to a development of the outer circumferential surface of the base material resist layer, in which the outer circumferential surface of the base material resist layer is cut in the axial direction and expanded in a single plane. Next, the formatter 231 partitions the input image into sub-regions of a certain size (for example, partitions the input image into a lattice), and determines whether or not the draw pattern is included in each of the sub-regions. Subsequently, the formatter 231 generates a control signal to perform control to irradiate with the laser light 200A each sub-region determined to include the draw pattern. Furthermore, the driver 233 controls the output of the laser light source 201 on the basis of the control signal generated by the formatter 231. As a result, the irradiation of the base material resist layer by the laser light 200A is controlled.

<8. Method of Manufacturing Master Film and Optical Film>

Next, a method of manufacturing the master film 10 and the optical film 21 will be described.

(Step 1)

Figure 3C:
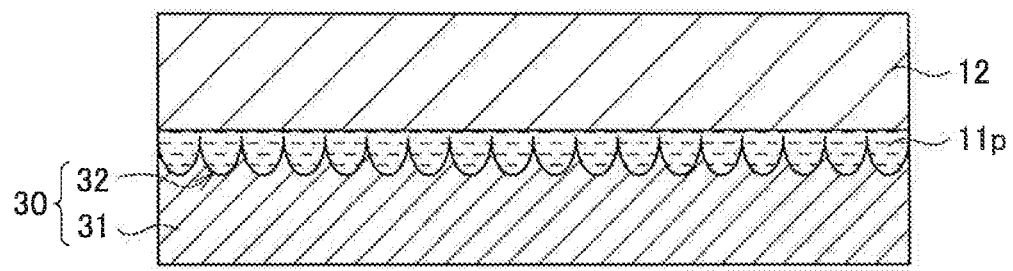
FIG. 3C is a cross-sectional view for explaining an optical body manufacturing process.

In Step 1, as illustrated in FIG. 3C, an uncured resin layer 11p for the master film is formed on the base material film 12. At this point, the uncured resin layer 11p for the master film is made of an uncured curing resin or the like. Herein, the curing resin is as described earlier. The release agent or the like described earlier may also be added to the uncured resin layer 11p for the master film. Next, the uncured resin layer 11p for the master film is put in close contact with the fourth concave-convex structure 32 of the first master 30. As a result, the fourth concave-convex structure 32 is transferred to the uncured resin layer 11p for the master film.

(Step 2)

Figure 3D:
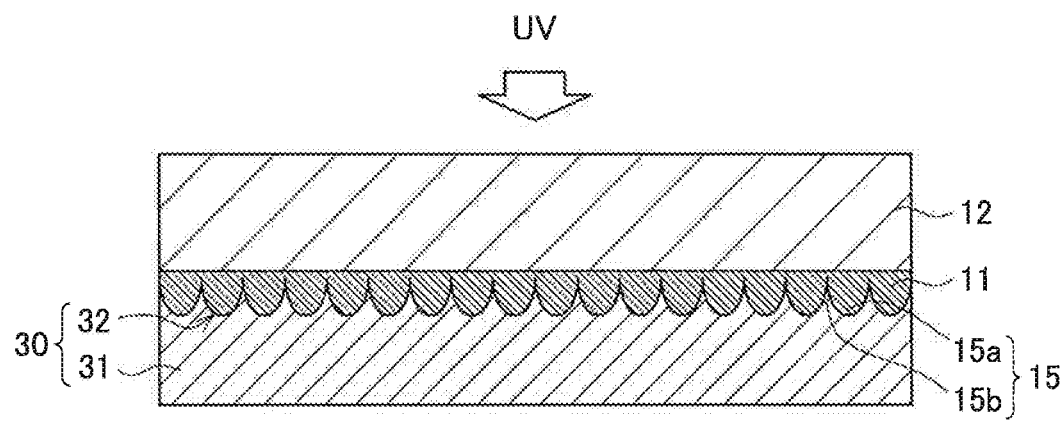
FIG. 3D is a cross-sectional view for explaining an optical body manufacturing process.
Figure 3E:
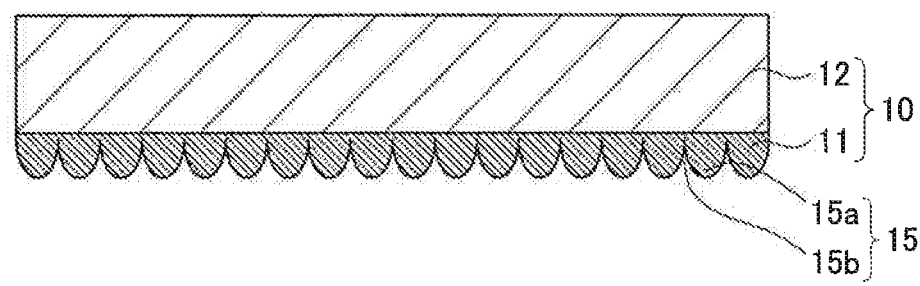
FIG. 3E is a cross-sectional view for explaining an optical body manufacturing process.

In Step 2, as illustrated in FIG. 3D, the uncured resin layer 11p for the master film is cured. As a result, the concave-convex resin layer 11 is formed on the base material film 12. In other words, the master film 10 is produced. In the example of FIG. 3D, the uncured resin layer 11p for the master film is cured by irradiating the uncured resin layer 11p for the master film with ultraviolet rays (UV light). Consequently, in this example, the uncured resin layer 11p for the master film is made of an ultraviolet-curing resin or the like. Next, as illustrated in FIG. 3E, the master film 10 is separated from the first master 30. On the surface of the third concave-convex structure 15, an inorganic film 16 as illustrated in FIG. 3L may be formed.

Note that Step 1 and Step 2 may also be conducted continuously by what is called a roll-to-roll transfer device. Hereinafter, a detailed configuration of a transfer device 300 will be described on the basis of FIG. 3J. The transfer device 300 illustrated in FIG. 3J is a roll-to-roll transfer device using the first master 30. The master film 10 may be produced by using such a transfer device 300. Note that in the transfer device 300, the master film 10 is produced using a light-curing resin. Obviously, the master film 10 may also be produced using another type of curing resin.

The transfer device 300 is provided with the first master 30, a base material supply roll 301, a take-up roll 302, guide rolls 303 and 304, a nip roll 305, a separation roll 306, an applicator device 307, and an energy source 309.

The base material supply roll 301 is an elongated roll around which the base material film 12 is wound in a roll, while the take-up roll 302 is a roll that takes up the master film 10. Also, the guide rolls 303 and 304 are rolls that transport the base material film 12. The nip roll 305 is a roll that puts the base material film 12 laminated with uncured resin layer 11p for the master film, or in other words a transfer film 100, in close contact with the first master 30. The separation roll 306 is a roll that separates the base material film 12 on which is formed the concave-convex resin layer 11, or in other words the master film 10, from the first master 30.

The applicator device 307 is provided with an applicating means such as a coater, and applies an uncured light-curing resin to the base material film 12, and forms the uncured resin layer 11p for the master film. The applicator device 307 may be a device such as a gravure coater, a wire bar coater, or a die coater, for example. Also, the energy source 309 is a light source that emits light of a wavelength able to cure the light-curing resin, and may be a device such as an ultraviolet lamp, for example.

In the transfer device 300, first, the base material film 12 is sent continuously from the base material supply roll 301 via the guide roll 303. Note that partway through the delivery, the base material supply roll 301 may also be changed to a base material supply roll 301 of a separate lot. The uncured light-curing resin is applied by the applicator device 307 to the delivered base material film 12, and the uncured resin layer 11p for the master film is laminated onto the base material film 12. As a result, the transfer film 100 is produced. The transfer film 100 is put into close contact with the first master 30 by the nip roll 305. As a result, the fourth concave-convex structure 32 of the first master 30 is transferred to the uncured resin layer 11p for the master film. The energy source 309 is provided on the outside of the first master 30. Subsequently, the energy source 309 irradiates with light the uncured resin layer 11p for the master film put in close contact with the first master 30, thereby curing the uncured resin layer 11p for the master film. As a result, the concave-convex resin layer 11 is formed on the base material film 12. Next, the base material film 12 on which is formed the concave-convex resin layer 11, or in other words the master film 10, is separated from the first master 30 by the separation roll 306. Next, the master film 10 is taken up by the take-up roll 302 via the guide roll 304.

In this way, in the transfer device 300, the circumferential shape of the first master 30 is transferred to the transfer film 100 while transporting the transfer film 100 roll-to-roll. As a result, the master film 10 is produced.

Note that in the case of preparing the master film 10 with a thermosetting resin, the applicator device 307 and the energy source 309 become unnecessary. Also, the base material film 12 is taken to be a thermoplastic resin film, and a heater device is disposed farther upstream than the first master 30. The base material film 12 is heated and softened by the heater device, and after that, the base material film 12 is pressed against the first master 30. As a result, the fourth concave-convex structure 32 formed on the circumferential face of the first master 30 is transferred to the base material film 12. In this case, the base material film 12 and the concave-convex resin layer 11 become a solid cast. Note that the base material film 12 may also be taken to be a film made up of a resin other than a thermoplastic resin, in which the base material film 12 and a thermoplastic resin film are laminated. In this case, the laminated film is pressed against the first master 30 after being heated by the heater device.

Consequently, the transfer device 300 is able to continuously produce a transfer product to which has been transferred the fourth concave-convex structure 32 of the first master 30, in other words, the master film 10. Herein, the fourth concave-convex structure 32 formed on the circumferential face of the first master 30 has the desired average period. Consequently, the third concave-convex structure 15 formed on the master film 10 has the desired average period.

(Step 3)

Figure 3F:
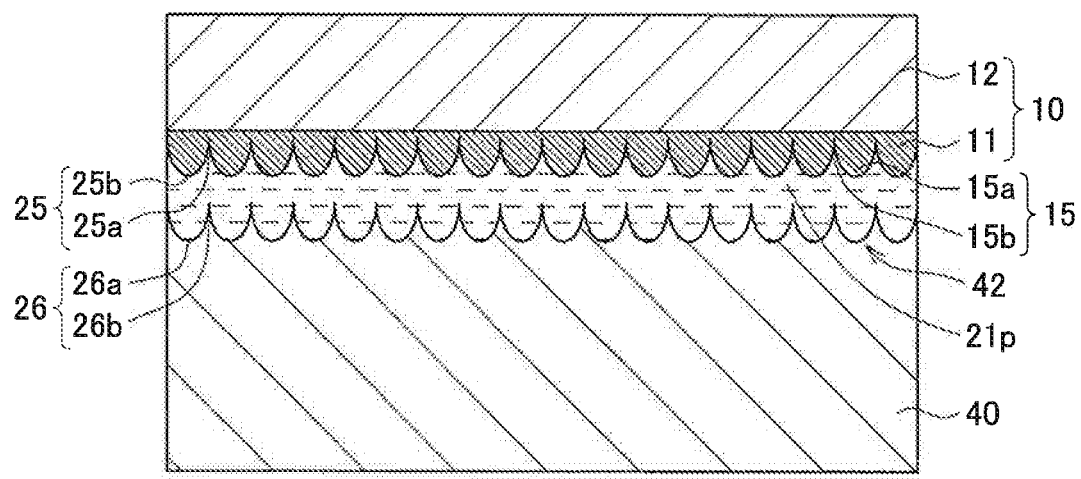
FIG. 3F is a cross-sectional view for explaining an optical body manufacturing process.

In Step 3, as illustrated in FIG. 3F, an uncured resin layer 21p for the optical film is formed on the third concave-convex structure 15. As a result, the third concave-convex structure 15 is transferred to the uncured resin layer 21p for the optical film.

At this point, it is sufficient for the uncured resin layer 21p for the optical film to be made of a similar material as the uncured resin layer 11p for the master film. However, the specific material of the uncured resin layers 11p for the master film and the uncured resin layers 21p for the optical film is selected so that the concave-convex resin layer 11 and the optical film 21 are separable. Additionally, the method of forming the uncured resin layer 21p for the optical film on the third concave-convex structure 15 is not particularly limited, and may be, for example, a method of dripping an uncured curing resin onto the third concave-convex structure 15 with a dropper, or as described later, a method using a device such as a gravure coater, a wire bar coater, or a die coater. Next, the uncured resin layer 21p for the optical film is put in close contact with the fifth concave-convex structure 42 of the second master 40. As a result, the fifth concave-convex structure 42 is transferred to the uncured resin layer 21p for the optical film.

(Step 4)

Figure 3G:
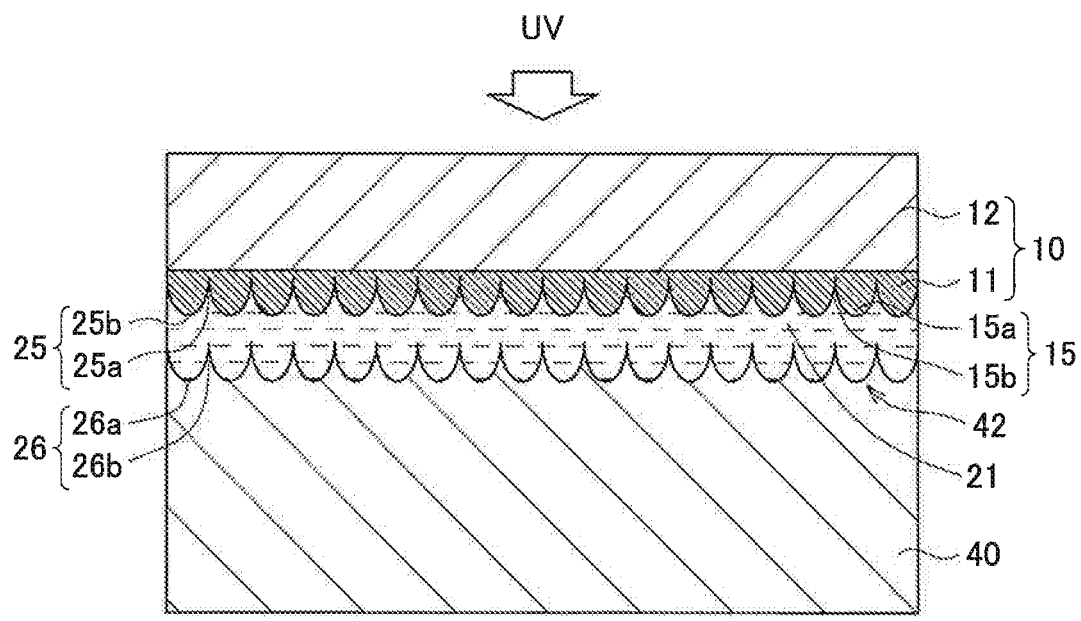
FIG. 3G is a cross-sectional view for explaining an optical body manufacturing process.
Figure 3H:
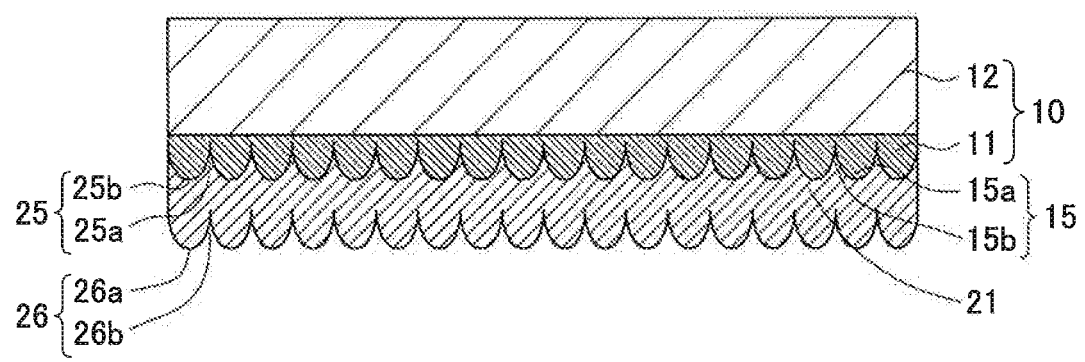
FIG. 3H is a cross-sectional view for explaining an optical body manufacturing process.
Figure 3I:
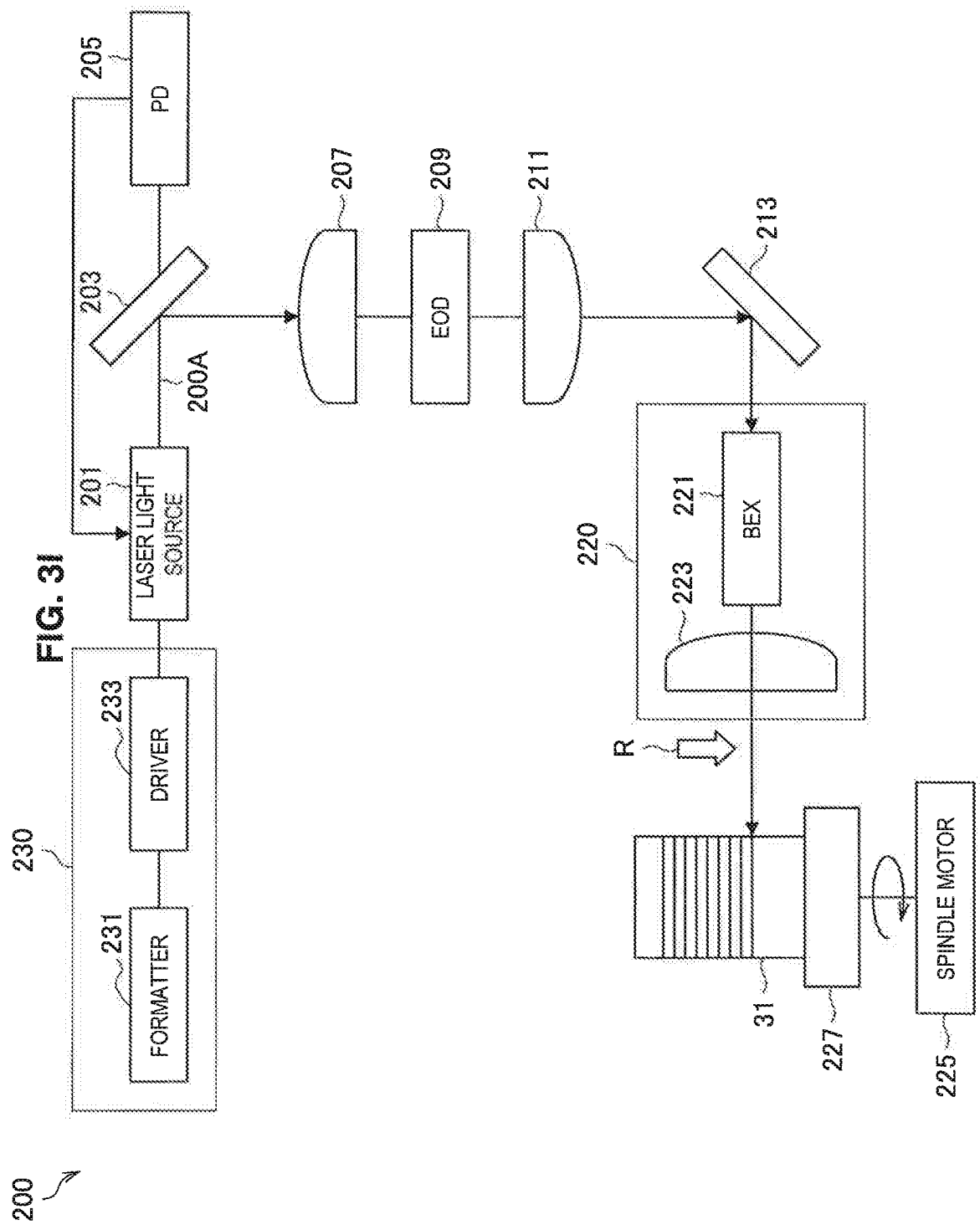
FIG. 3I is a block diagram illustrating an example configuration of a photolithography device.
Figure 3J:
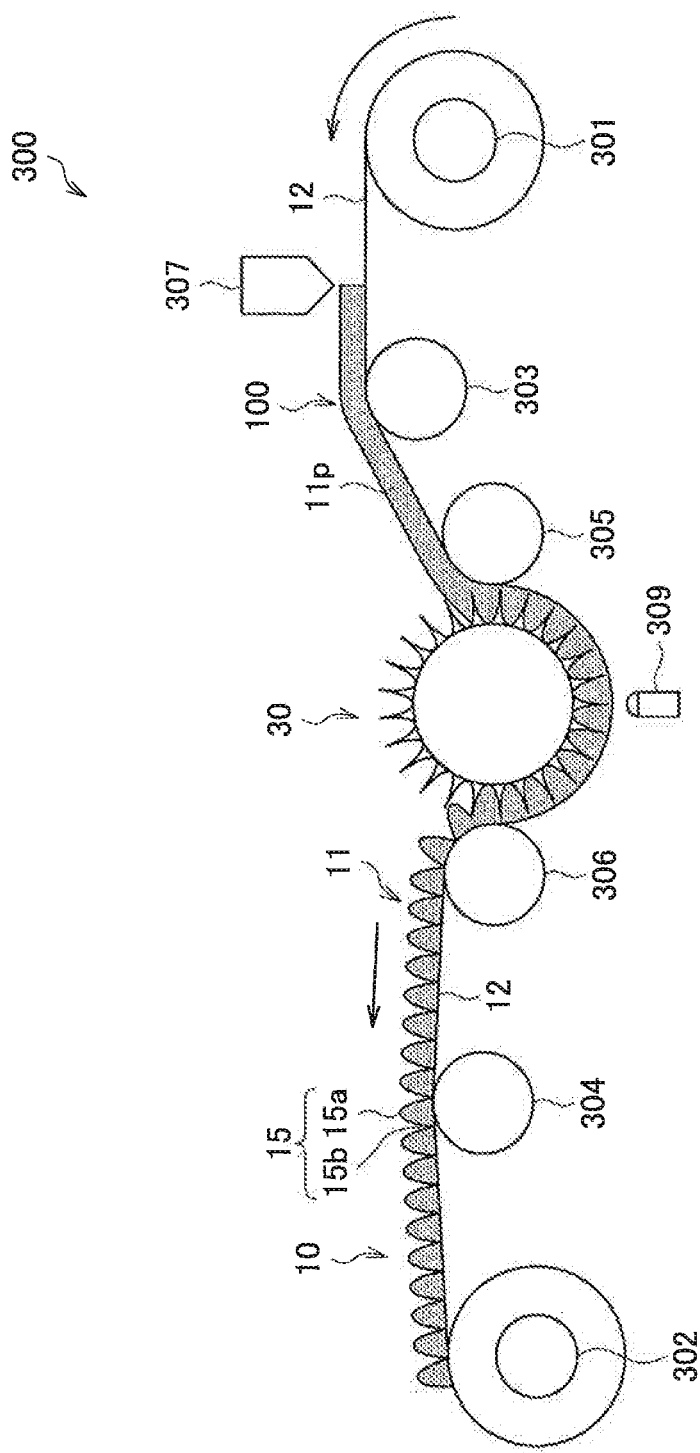
FIG. 3J is a schematic depiction illustrating an example of a transfer device that manufactures a master film roll-to-roll.

Next, in Step 4, as illustrated in FIG. 3G, the uncured resin layer 21p for the optical film is cured. As a result, the second concave-convex structure 26 is formed on the optical film 21. In the example of FIG. 3G, the uncured resin layer 21p for the optical film is cured by irradiating the uncured resin layer 21p for the optical film with ultraviolet rays (UV light). Consequently, in this example, the uncured resin layer 21p for the optical film is made of an ultraviolet-curing resin or the like. Next, as illustrated in FIG. 3H, the optical film 21 is separated from the second master 40.

Note that in the present embodiment, a concave-convex structure is formed on both the front and back sides of the optical film 21. For this reason, both an anchor effect on the master film 10 and an anchor effect on the second master 40 are produced. Additionally, in the case where the anchor effect on the second master 40 is excessively greater than the anchor effect on the master film 10, the following problem may occur. Namely, when peeling the optical film 21 away from the second master 40, there is a possibility that instead of the second master 40 peeling away from the optical film 21, the master film 10 may peel away from the optical film 21. For this reason, as described earlier, the aspect ratio of the second concave-convex structure 26 is preferably smaller than the aspect ratio of the first concave-convex structure 25.

(Step 5)

Next, as illustrated in FIG. 1, the adhesive layer 23 is formed on top of the second concave-convex structure 26. For example, an adhesive tape is applied on top of the second concave-convex structure 26. As a result, the optical body 1 is produced.

Figure 3K:
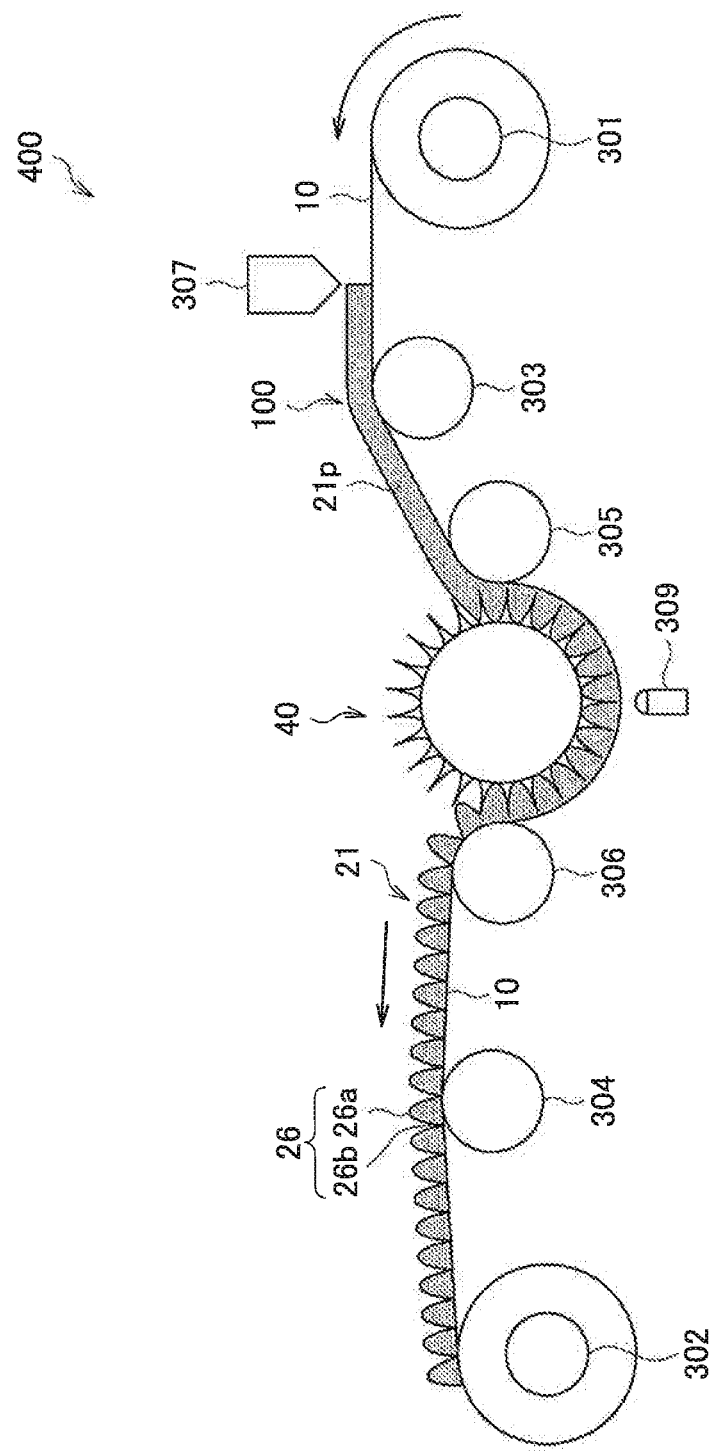
FIG. 3K is a schematic depiction illustrating an example of a transfer device that manufactures an optical film roll-to-roll.
Figure 3L:
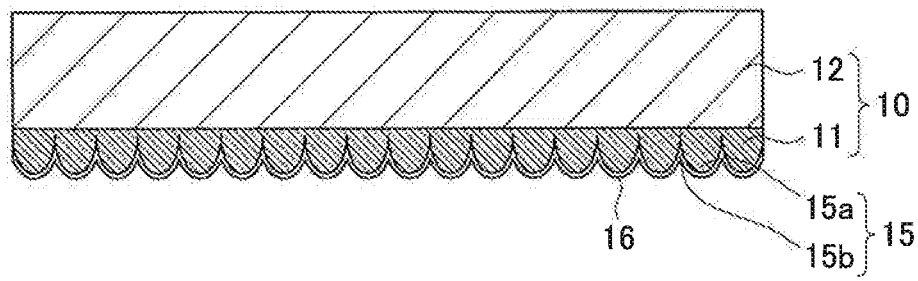
FIG. 3L is a cross-sectional view for explaining an optical body manufacturing process.

Note that Step 3 and Step 4 may also be conducted continuously by what is called a roll-to-roll transfer device. Hereinafter, a detailed configuration of a transfer device 400 will be described on the basis of FIG. 3K. Note that since the transfer device 400 has a configuration mostly similar to the transfer device 300, only the different points will be described herein.

The transfer device 400 transports the master film 10 instead of the base material film 12. In other words, the base material supply roll 301 is a roll around which the master film 10 is wound in a roll, while the take-up roll 302 is a roll that takes up the master film 10 on which the optical film 21 is formed. The guide rolls 303 and 304 are rolls that transport the master film 10. The nip roll 305 is a roll that puts the master film 10 laminated with uncured resin layer 21p for the optical film, or in other words a transfer film 100, in close contact with the second master 40. The separation roll 306 is a roll that separates the optical film 21 on which is formed the second concave-convex structure 26 from the second master 40. The applicator device 307 applies an uncured light-curing resin to the master film 10, and forms the uncured resin layer 21p for the optical film.

In the transfer device 400, first, the master film 10 is sent continuously from the base material supply roll 301 via the guide roll 303. Note that partway through the delivery, the base material supply roll 301 may also be changed to a base material supply roll 301 of a separate lot. The uncured light-curing resin is applied by the applicator device 307 to the delivered master film 10, and the uncured resin layer 21p for the optical film is laminated onto the master film 10. As a result, the transfer film 100 is produced. The transfer film 100 is put into close contact with the second master 40 by the nip roll 305. As a result, the fifth concave-convex structure 42 of the second master 40 is transferred to the uncured resin layer 21p for the optical film. The energy source 309 is provided on the outside of the second master 40. Subsequently, the energy source 309 irradiates with light the uncured resin layer 21p for the optical film put in close contact with the second master 40, thereby curing the uncured resin layer 21p for the optical film. As a result, the second concave-convex structure 26 is formed on the optical film 21. Next, the optical film 21 on which is formed the second concave-convex structure 26, is separated from the second master 40 by the separation roll 306. Next, the master film 10 and the optical film 21 are taken up by the take-up roll 302 via the guide roll 304.

In this way, in the transfer device 400, the circumferential shape of the second master 40 is transferred to the transfer film 100 while transporting the transfer film 100 roll-to-roll. As a result, the second concave-convex structure 26 is formed on the optical film 21. In the transfer device 400, the optical film 21 likewise may be manufactured using a thermoplastic resin.

<9. Optical Body Usage Method>

(First Usage Method)

Next, a first usage method of the optical body 1 will be described on the basis of FIGS. 4A and 4B. In this usage method, the adhesive layer 23 is applied to the optical body 1. As illustrated in FIG. 4A, first, the adhesive layer 23 of the optical body 1 is applied to the surface of an adherend 500. The master film 10 is able to protect the first concave-convex structure 25 of the optical film 21. For example, the master film 10 is able to prevent contact, friction, and the like between the first concave-convex structure 25 and another object. Next, as illustrated in FIG. 4B, only the master film 10 is peeled away from the optical body 1. At this point, since the master film 10 is formed from a cured curing resin, residual debris or the like from the master film 10 is unlikely to remain on the first concave-convex structure 25 of the optical film 21. Furthermore, since the optical film 21 may be made thinner, after the master film 10 is peeled away from the optical body 1, the optical film 21 is able to conform to surface concavities and convexities easily. Also, the master film 10 is usable as an anti-reflective film or the like. Note that the type of the adherend 500 is not particularly limited. For example, the adherend 500 may be any of various types of optical devices (optical components), display elements, and input elements. The adherend 500 may be an object such as a camera, a display, a projector, a telescope, a touch panel, a wearable terminal, a head-mounted display, an in-vehicle display, or a show window, for example. Particularly, the optical film 21 is able to conform to the surface shape of the adherend 500 even if the surface shape of the adherend 500 is distorted (having concavities and convexities or having a curved face, for example). The optical body 1 may be used as an anti-reflective film for these optical devices. Obviously, the optical body 1 may also be applied to another adherend 500.

(Second Usage Method)

Figure 5A:
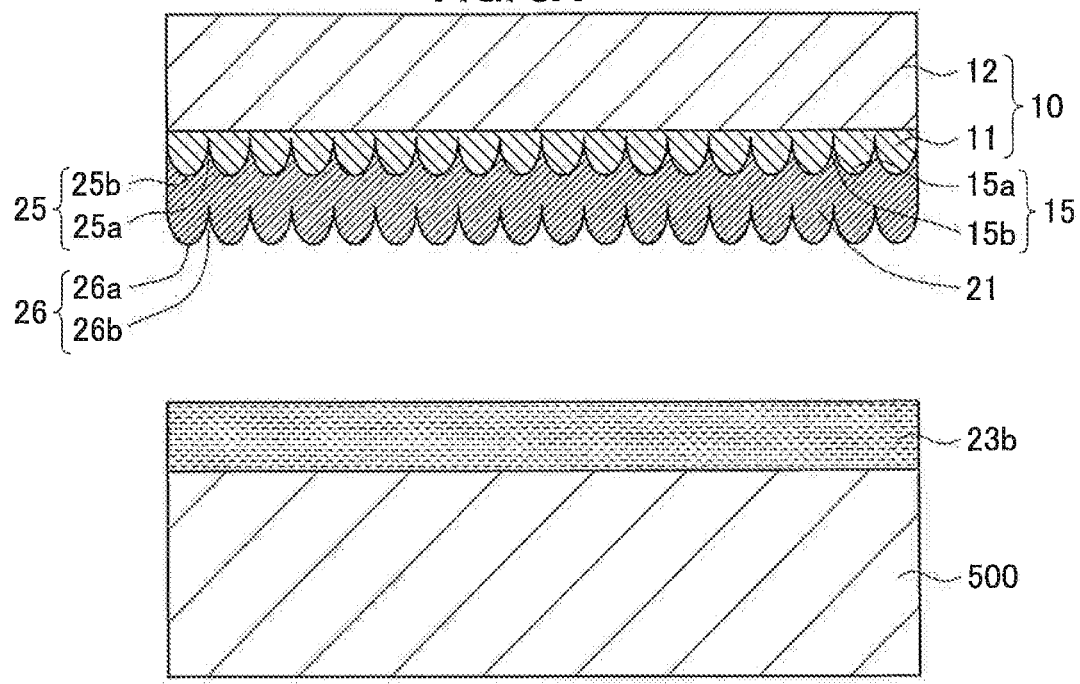
FIG. 5A is a cross-sectional view illustrating another example of an optical body usage method.
Figure 5B:
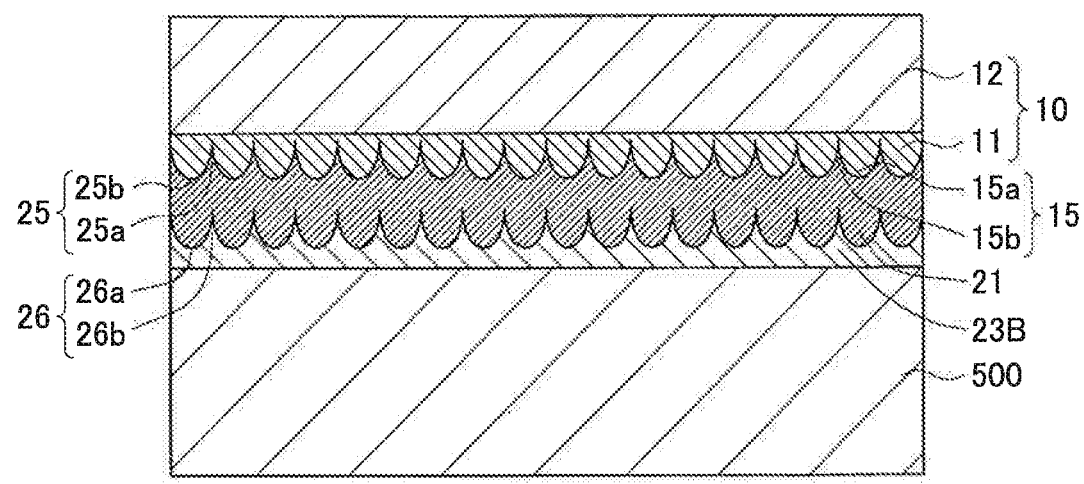
FIG. 5B is a cross-sectional view illustrating another example of an optical body usage method.
Figure 5C:
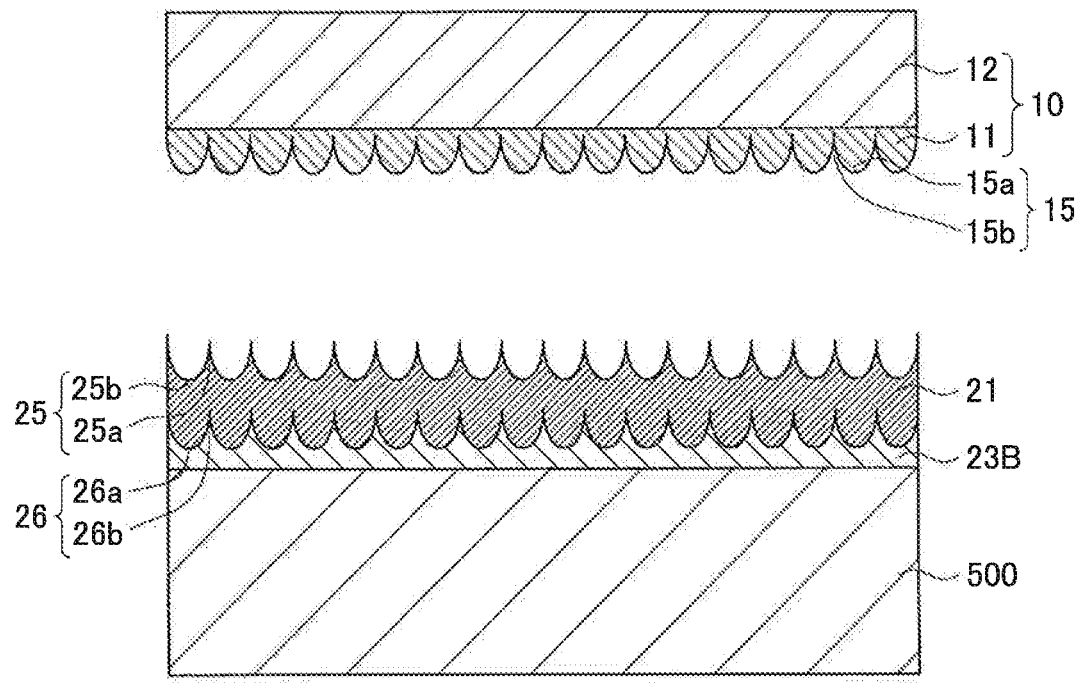
FIG. 5C is a cross-sectional view illustrating another example of an optical body usage method.

Next, a second usage method of the optical body 1 will be described on the basis of FIGS. 5A to 5C. In this usage method, the adhesive layer 23 is not applied to the optical body 1. As illustrated in FIG. 5A, first, an uncured adhesive layer 23b is formed on the surface of the adherend 500. The type of adhesive agent constituting the adhesive layer 23b does not particularly matter, and may be similar to the adhesive agent constituting the adhesive layer 23, for example. Next, as illustrated in FIG. 5B, the optical body 1 is applied to the adhesive layer 23b. Next, by curing the adhesive layer 23b, the adhesive layer 23b becomes a cured layer 23B. For example, the adhesive layer 23b may be cured by irradiating the adhesive layer 23b with ultraviolet rays. In this case, the adhesive layer 23b is made of a light-curing resin. Next, as illustrated in FIG. 5C, only the master film 10 is peeled away from the optical body 1.

As above, according to the present embodiment, the first concave-convex structure 25 of the optical film 21 is protected by the master film 10, and thus a protective film becomes unnecessary. Furthermore, the master film 10 is made up of a cured curing resin. For this reason, when the master film 10 is peeled away from the optical film 21, residual debris or the like from the master film 10 is unlikely to remain on the first concave-convex structure 25 of the optical film 21. Furthermore, since the optical body 1 is able to gain thickness due to the master film 10, the handling properties of the optical body 1 may be improved while also making the optical film 21 thinner. Furthermore, the optical film includes a second concave-convex structure. For this reason, the adhesive strength between the optical film and the adhesive layer increases due to the anchor effect provided by the second concave-convex structure. Consequently, the optical film may be applied more firmly to the adherend.

EXAMPLES

Hereinafter, the present invention will be described more specifically using Examples.

Example 1

In Example 1, the optical body 1 was produced according to the following steps. As the base material film 12, a PET film with a thickness of 50 μm was prepared. Additionally, as the light-curing resin, an ultraviolet-curing acrylic resin (Dexerials Corp., SK1100 series) to which a silicone-based release agent (BYK, silicone lubricant BYK-333) was added was prepared. Subsequently, by coating the base material film 12 with the light-curing resin, the uncured resin layer 11p for the master film was formed on the base material film 12. Meanwhile, the first master 30 was produced using the exposure device 200 described earlier. Next, by pressing the uncured resin layer 11p for the master film against the circumferential surface of the first master 30, the fourth concave-convex structure 32 formed on the circumferential surface of the first master 30 was transferred to the uncured resin layer 11p for the master film. Next, by curing the uncured resin layer 11p for the master film, the concave-convex resin layer 11 was produced. In other words, the master film 10 was produced.

At this point, the thickness of the concave-convex resin layer 11 was taken to be approximately 3 μm. Also, the third convexities 15a and the third concavities 15b of the third concave-convex structure 15 were arranged in a staggered lattice. Also, the shapes of the third convexities 15a were taken to be bullet-shaped, the height L1 of the third convexities 15a was taken to be approximately 200 nm, the dot pitch L2 was taken to be approximately 270 nm, and the track pitch L3 was taken to be approximately 153 nm. Note that the surface shape of the third concave-convex structure 15 was confirmed with a scanning electron microscope (SEM).

Meanwhile, as the light-curing resin used for the optical film 21, an ultraviolet-curing resin was prepared in which a modified diacrylate with few functional groups (Toagosei Co., M260) was added to a multifunctional special acrylate (Dexerials Corp., SK1100 series). In other words, in Example 1, a modified diacrylate with few functional groups was added to an ultraviolet-curing resin to make the elastic modulus of the optical film 21 lower than the elastic modulus of the concave-convex resin layer 11. Furthermore, in consideration of the separability of the optical film 21 and the master film 10, a silicone-based release agent (BYK, product name: Silicone Lubricant BYK-333) was also added to the light-curing resin that forms the optical film 21.

Subsequently, by coating the third concave-convex structure 15 of the master film 10 with the light-curing resin, the uncured resin layer 21p for the optical film was formed on the third concave-convex structure 15. As a result of this step, the third concave-convex structure 15 was transferred to the uncured resin layer 21p for the optical film. In other words, the first concave-convex structure 25 was formed on the optical film 21. The first concave-convex structure 25 had the reverse shape of the third concave-convex structure 15. The aspect ratio of the first concave-convex structure 25 was taken to be 1.3. Meanwhile, the second master 40 was produced using the exposure device 200 described earlier. Next, by pressing the uncured resin layer 21p for the optical film against the circumferential surface of the second master 40, the fifth concave-convex structure 42 formed on the circumferential surface of the second master 40 was transferred to the uncured resin layer 21p for the optical film. Next, by curing the uncured resin layer 21p for the optical film, the second concave-convex structure 26 was formed on the optical film 21. Note that the second convexities 26a and the second concavities 26b of the second concave-convex structure 26 were arranged in a staggered lattice. Also, the shapes of the second convexities 26a were taken to be bullet-shaped, the height L1 of the second convexities 26a was taken to be approximately 130 nm, and the dot pitch L2 and the track pitch L3 were taken to be similar to the first concave-convex structure 25 and the third concave-convex structure 15. Also, the aspect ratio of the second concave-convex structure 26 was taken to be 0.62. Consequently, the aspect ratio of the second concave-convex structure 26 was made smaller than the aspect ratio of the first concave-convex structure 25. Note that the surface shape of the second concave-convex structure 26 was confirmed with a scanning electronic microscope (SEM).

At this point, the thickness of the optical film 21 was taken to be approximately 3 μm. Also, the elastic modulus of the master film 10 (specifically, the elastic modulus of the concave-convex resin layer 11) and the elastic modulus of the optical film 21 were measured by a dynamic viscoelasticity measuring apparatus (DMA) (TA Instruments Rheometrics System Analyzer-3 (RSA-3)). The result was that the elastic modulus of the master film 10 was 2710 MPa, while the elastic modulus of the optical film 21 was 1300 MPa. Next, as the adhesive layer 23, an optically clear adhesive tape (OCA tape) with a thickness of 25 μm (acrylic adhesive material, product name: FW25, Nichiei Kakoh Co., Ltd.) was applied to the optical film 21. By the above steps, the optical body 1 was produced.

Figure 6A:
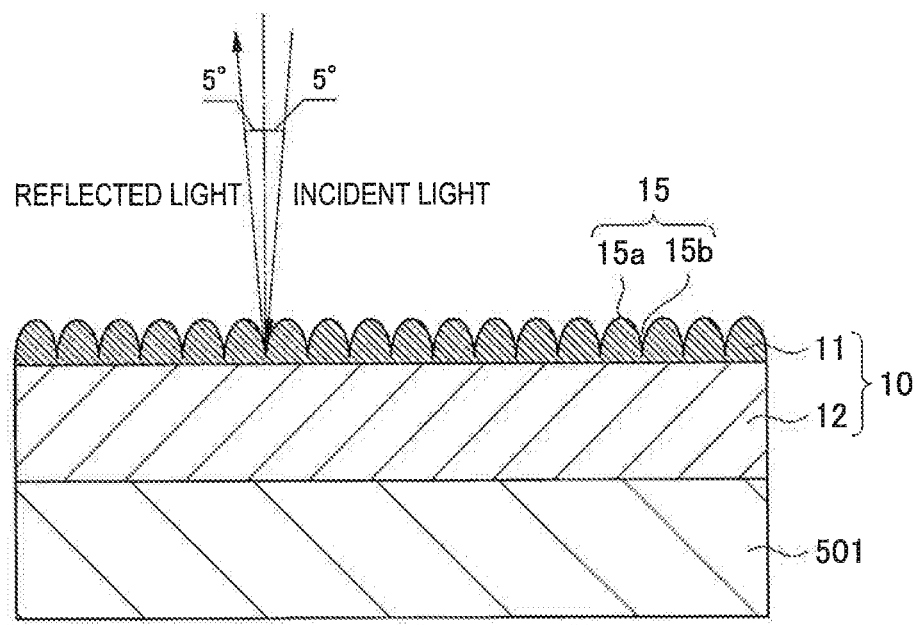
FIG. 6A is a cross-sectional view for explaining a method of measuring a spectral reflectance of a master film.

The spectral reflection spectrum of the master film 10 was measured according to the following steps. Namely, as illustrated in FIG. 6A, a black polyethylene terephthalate (PET) plate 501 was applied by OCA tape to the other surface of the master film 10 (the surface on the side on which the concave-convex structure 11 was not formed). In other words, reflections from the other surface of the master film 10 could be cancelled. Subsequently, the spectral specular reflection spectrum at the third concave-convex structure 15 was measured. The spectral specular reflection spectrum was measured using a spectrophotometer (model number V-550 with absolute reflectance measuring unit attached, JASCO Corporation). Also, the angle of incidence and the angle of reflection were both taken to be 5°, the wavelength range was taken to be from 350 nm to 800 nm, and the wavelength resolution was taken to be 1 nm. As a result, the spectral reflectance was confirmed to take a value from 0.1% to 1.5%.

Figure 6B:
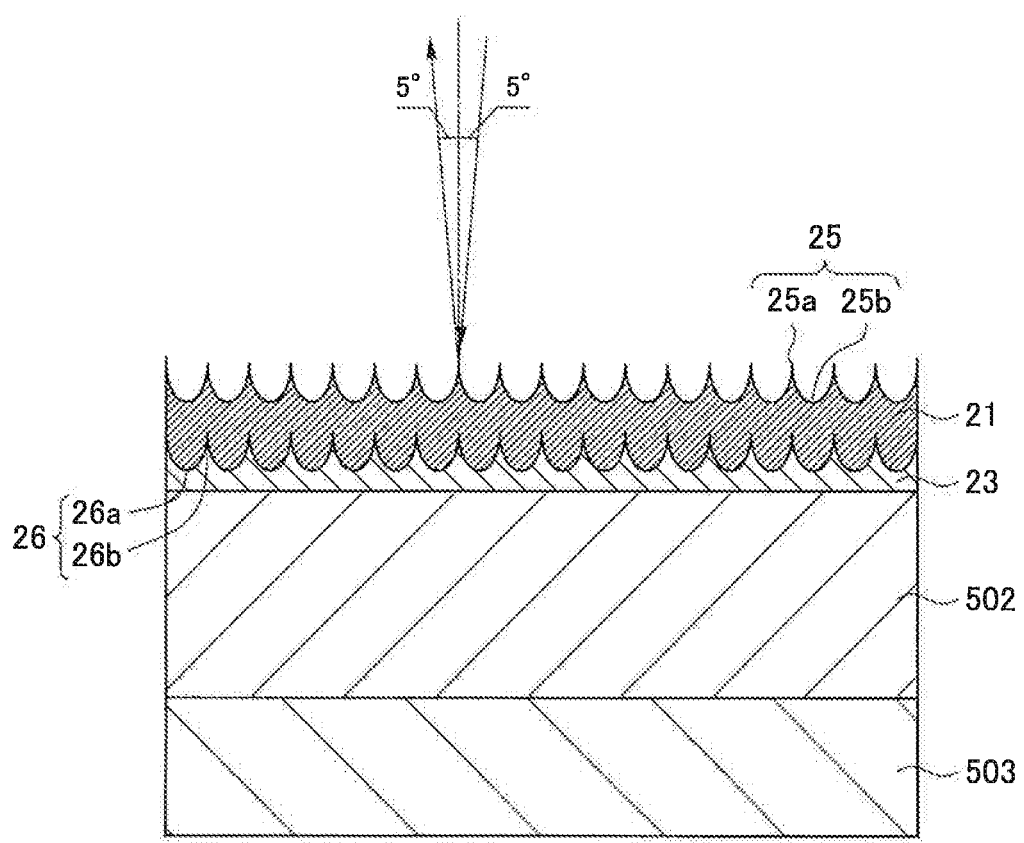
FIG. 6B is a cross-sectional view for explaining a method of measuring a spectral reflectance of an optical film.

The spectral reflection spectrum of the optical film 21 was measured according to the following steps. Namely, as illustrated in FIG. 6B, the optical body 1 is applied to a glass adherend 502 by the adhesive layer 23, and only the master film 10 is peeled away. At this point, the optical film 21 did not separate from the adherend 502. Furthermore, on the other surface of the adherend 502 (the surface on the side on which the optical film 21 was not applied), the black PET plate 503 was applied by OCA tape. Consequently, reflections from the other surface of the adherend 502 could be cancelled. By the above steps, an optical film adhesive body was produced. Subsequently, the spectral specular reflection spectrum at the first concave-convex structure 25 was measured. The specific measuring method was taken to be similar to that of the master film 10.

Additionally, simulation software (TFCalc, HULINKS Inc.) was used to calculate the spectral reflection spectrum of the optical film 21. Specifically, the parameters of the optical film 21 were input into the simulation software. At this point, the refractive index of the optical film 21 was taken to be 1.53, the refractive index of the adhesive layer 23 was taken to be 1.65, and the refractive index of the adherend 502 was taken to be 1.65. Additionally, the first concave-convex structure 25 was taken to be bullet-shaped in the depth direction as obtained by a second-order function, and to be provided with a pitch less than or equal to the visible light wavelengths. Also, the first concave-convex structure 25 of the optical film 21 was modeled as a multilayer film with 10 layers. Each layer was approximated by dividing the height of the concavities and convexities by 10. Also, the angle of incidence and the angle of reflection were both taken to be 5°, and the wavelength range was taken to be from 350 nm to 800 nm.

Figure 7A:
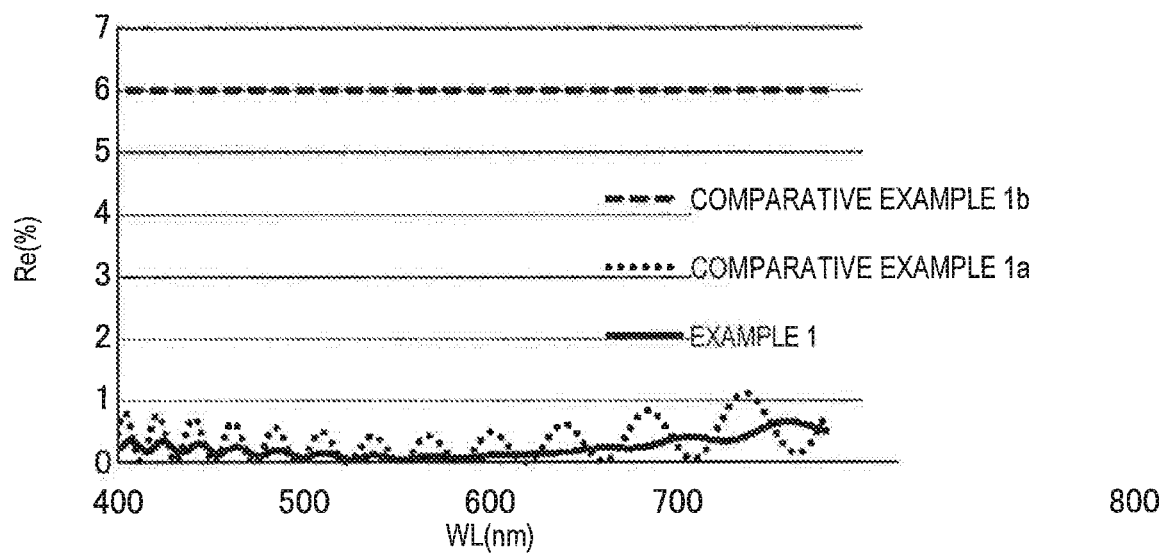
FIG. 7A is spectral reflection spectra of Example 1 and Comparative Examples 1a and 1b.

The results of the simulation are illustrated in FIG. 7A. As FIG. 7A clearly demonstrates, the spectral reflectance of the optical film 21 (for wavelengths from 350 nm to 800 nm) is from 0.1% to 1.8%. Note that the spectral reflectance actually measured using a spectrophotometer yielded mostly similar results. Note that in FIGS. 7A to 7C, the horizontal axis represents the wavelength, while the vertical axis represents the spectral reflectance (specular reflectance).

Comparative Example 1a

An optical body was produced by following similar steps as Example 1, except that the surface on the adhesive layer side of the optical film 21 was made flat. Additionally, an optical film adhesive body was produced by following similar steps as Example 1. Next, simulation software (TFCalc, HULINKS Inc.) was used to calculate the spectral reflection spectrum of the optical film adhesive body. The measurement conditions were similar to Example 1. The results are illustrated in FIG. 7A. In Comparative Example 1a, to the extent that the second concave-convex structure 26 was not formed, the spectral reflectance rose slightly, and ripples were observed. Consequently, it was concluded that the second concave-convex structure 26 in which the average period of the concavities and convexities is less than or equal to the visible light wavelengths is preferably formed on the optical film 21.

Comparative Example 1b

An optical body was produced by following similar steps as Example 1, except that the surface on both sides of the optical film 21 was made flat. Additionally, an optical film adhesive body was produced by following similar steps as Example 1. Next, simulation software (TFCalc, HULINKS Inc.) was used to calculate the spectral reflection spectrum of the optical film adhesive body. The measurement conditions were similar to Example 1. The results are illustrated in FIG. 7A. In Comparative Example 1b, since neither the first concave-convex structure 25 nor the second concave-convex structure 26 was formed on the optical film 21, the spectral reflectance rose greatly. Specifically, the spectral reflectance became a value of approximately 6%.

Example 2

Figure 7B:
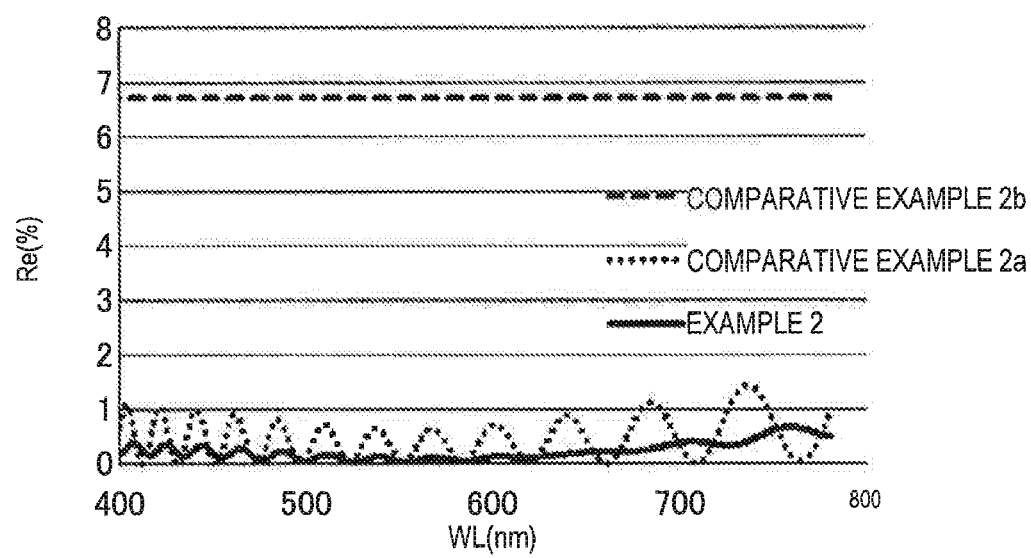
FIG. 7B is spectral reflection spectra of Example 2 and Comparative Examples 2a and 2b.

The spectral reflection spectrum of the optical film adhesive body was calculated by conducting a process similar to Example 1, except that the refractive index of the adhesive layer 23 was taken to be 1.7 and the refractive index of the adherend 502 was taken to be 1.7. The results are illustrated in FIG. 7B. In Example 2, results mostly similar to Example 1 are likewise obtained.

Comparative Example 2a

The spectral reflection spectrum of the optical film adhesive body was calculated by conducting a process similar to Example 2, except that the surface on the adhesive layer side of the optical film 21 was made flat. The results are illustrated in FIG. 7B. In Comparative Example 2a, results mostly similar to Comparative Example 1a are obtained.

Comparative Example 2b

The spectral reflection spectrum of the optical film adhesive body was calculated by conducting a process similar to Example 2, except that the surface on both sides of the optical film 21 was made flat. The results are illustrated in FIG. 7B. In Comparative Example 2b, results mostly similar to Comparative Example 1b are obtained. However, the spectral reflectance rose further to become a value close to 7%.

Example 3

Figure 7C:
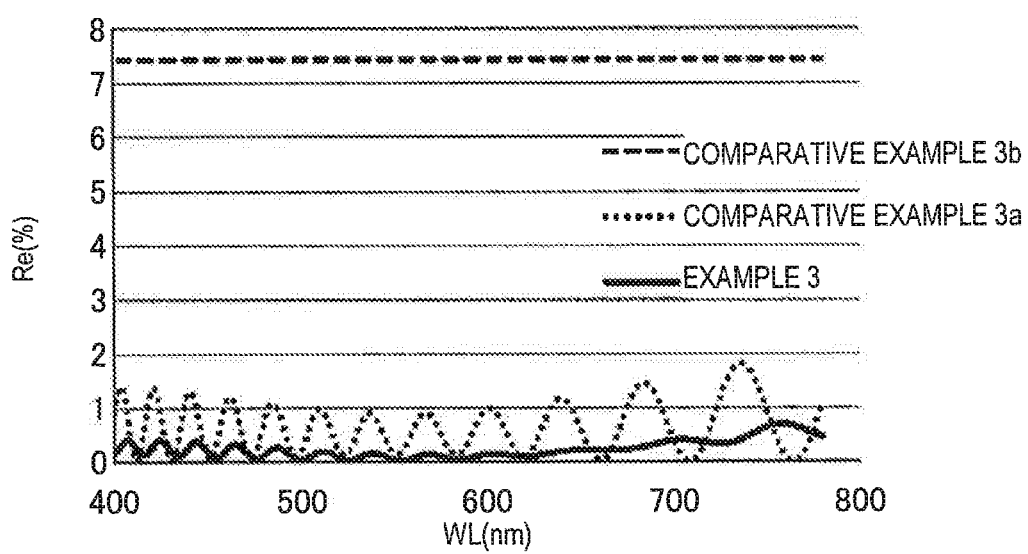
FIG. 7C is spectral reflection spectra of optical films of Example 3 and Comparative Examples 3a and 3b.

The spectral reflection spectrum of the optical film adhesive body was calculated by conducting a process similar to Example 1, except that the refractive index of the adhesive layer 23 was taken to be 1.75 and the refractive index of the adherend 502 was taken to be 1.75. The results are illustrated in FIG. 7C. In Example 3, results mostly similar to Example 1 are likewise obtained.

Comparative Example 3a

The spectral reflection spectrum of the optical film adhesive body was calculated by conducting a process similar to Example 3, except that the surface on the adhesive layer side of the optical film 21 was made flat. The results are illustrated in FIG. 7C. In Comparative Example 3a, results mostly similar to Comparative Example 1a are obtained.

Comparative Example 3b

The spectral reflection spectrum of the optical film adhesive body was calculated by conducting a process similar to Example 3, except that the surface on both sides of the optical film 21 was made flat. The results are illustrated in FIG. 7C. In Comparative Example 3a, results mostly similar to Comparative Example 1a are obtained. However, the spectral reflectance rose further, and exceeded 7%. Consequently, in Comparative Examples 1b, 2b, and 3b, the spectral reflectance became approximately from 6% to 8%.

Example 4

The spectral reflection spectrum of the film adhesive body was calculated by conducting a process similar to Example 1, except that the height of the first convexities 25a of the optical film 21 was taken to be 220 nm, and the height of the second convexities 26a was taken to be 200 nm. The results are illustrated in FIG. 8. As illustrated in FIG. 8, in Example 4, results mostly similar to Example 1 are likewise obtained.

Comparative Example 4

The spectral reflection spectrum of the film adhesive body was calculated by conducting a process similar to Example 1, except that the height of the first convexities 25a of the optical film 21 was taken to be 220 nm, and the surface of the adhesive layer side was made flat. The results are illustrated in FIG. 8. In Comparative Example 4, to the extent that the second concave-convex structure 26 was not formed, the spectral reflectance rose slightly, and ripples were observed. Note that FIG. 8 also illustrates the calculation results from Comparative Example 1b.

Example 5

The spectral reflection spectrum of the film adhesive body was calculated by conducting a process similar to Example 1, except that the height of the first convexities 25a of the optical film 21 was taken to be 220 nm, and the height of the second convexities 26a was taken to be 100 nm. The results are illustrated in FIG. 8. As illustrated in FIG. 8, in Example 5, slight ripples were observed, but the ripples were smaller than the ripples of Comparative Example 4.

Consequently, it was concluded that the second concave-convex structure 26 in which the average period of the concavities and convexities is less than or equal to the visible light wavelengths is preferably formed on the optical film 21. It was also concluded that the second concave-convex structure 26 preferably has a shape that is comparable with the first concave-convex structure 25.

Example 6

In Example 6, the optical body 1 similar to Example 1 was produced. Next, a silicon adhesive agent that acted as a light-curing adhesive agent (Shin-Etsu Chemical Co., KER2500) was used to coat a white plate glass (coat thickness from 0.005 mm to 0.01 mm). Next, the optical film 21 of the optical body 1 was applied to the silicone adhesive layer. Next, the silicone adhesive layer was cured. Next, the master film 10 was peeled away. As a result, a white plate glass with the optical film applied thereto was obtained.

In Example 6, the light-resistance of the white plate glass with the optical film applied thereto was examined. Specifically, light was radiated under the following conditions from the optical film 21 side of the white plate glass with the optical film applied thereto. Additionally, before and after the light radiation, the spectral transmittance of the white plate glass with the optical film applied thereto was measured with a V-560 spectrophotometer and an absolute reflectance measuring unit ARV-474S from JASCO Corporation.

Light Radiation Conditions
Light source: ultraviolet LED lamp (wavelength 385 nm)
Intensity: 1000 mW/cm$^2$
Distance between light source and white plate glass with optical film applied thereto: 2 cm
Radiation time: 2 hours Additionally, as an optical film according to a control (I), a cyclo-olefin polymer (COP) film (Zeon Corporation, ZF14) (thickness 100 µm) was prepared. Furthermore, the silicone adhesive agent used in Example 6 was used to coat the surface of a white plate glass with at a coat thickness of 0.01 mm and then light-cured, thereby preparing an optical film according to a control (II). Subsequently, the spectral transmittance of these optical films was measured similarly.

The results are illustrated in FIG. 9. In FIG. 9, the horizontal axis represents the wavelength, while the vertical axis represents the diffuse transmittance (spectral transmittance). According to FIG. 9, the optical body 1 does not undergo great variations in transmittance before and after being irradiated with ultraviolet rays, and maintains a high transmittance, thus demonstrating better light resistance than the COP film (control (I)) and the optical film with a cured silicone adhesive agent (control (II)), which are typically considered to have excellent optical properties.

(Application Test)

A frame body with a height of 50 µm was attached to the surface of a glass substrate to thereby produce the adherend. Subsequently, the optical body 1 produced in Example 1 was attached to the adherend, and after that, the master film 10 was peeled away. Also, a similar adherend was produced, and the master film 10 was attached to the adherend by OCA tape. In other words, a film adhesive body to which was applied the optical film 21, and a film adhesive body to which was applied the master film 10, were produced. Subsequently, these film adhesive bodies were observed visually. As a result, in the film adhesive body to which was applied the optical film 21, almost no air gap 54 was observed at the perimeter of the frame body. However, in the film adhesive body to which was applied the master film 10, a large air gap 54 was observed in numerous places at the perimeter of the frame body.

Furthermore, an autoclaving process (conditions: 50° C. and +0.5 atm, maintained for 0.5 h) was conducted on each film adhesive body. Subsequently, the film adhesive bodies after the autoclaving process were observed visually. As a result, in the film adhesive body to which was applied the optical film 21, it was confirmed that the air gap 54 had disappeared. On the other hand, in the film adhesive body to which was applied the master film 10, there was no change in the distribution of the air gap 54. In other words, a large air gap 54 was still observed in numerous places.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

INDUSTRIAL APPLICABILITY

The optical film of the present invention is useful as a film that imparts an anti-reflective function in optical devices such as cameras, displays, projectors, and telescopes.

REFERENCE SIGNS LIST

1 optical body
10 master film
11 concave-convex resin layer
12 base material film
15 third concave-convex structure
15*a* third convexity
15*b* third concavity
21 optical film
23 adhesive layer
25 first concave-convex structure
25*a* first convexity
25*b* first concavity
26 second concave-convex structure
26*a* second convexity
26*b* second concavity

The invention claimed is:

1. An optical body, comprising:
an optical film provided with a first concave-convex structure formed on one surface of the optical film, and a second concave-convex structure formed on an other surface of the optical film; and
a master film that covers the first concave-convex structure, wherein
an average period of concavities and convexities of the first concave-convex structure is less than or equal to visible light wavelengths, and
the master film is provided with a third concave-convex structure which is formed on a surface that faces the first concave-convex structure, and which has a reverse shape of the first concave-convex structure,
wherein the optical film and the master film are separable from each other at an interface between the first concave-convex structure and the third concave-convex structure by virtue of a following condition applying:
(a) an elastic modulus of the optical film is different from an elastic modulus of the master film, and the elastic modulus of the optical film is from 300 MPa to 700 MPa, and the elastic modulus of the master film is from 700 MPa to 1500 MPa, and
wherein an aspect ratio of the second concave-convex structure is smaller than an aspect ratio of the first concave-convex structure,
the aspect ratio of the first concave-convex structure is a ratio of a height of convexities constituting the first concave-convex structure and a diameter of a bottom face of concavities constituting the first concave-convex structure, and the aspect ratio of the second concave-convex structure is a ratio of a height of convexities constituting the second concave-convex structure and a diameter of a bottom face of concavities constituting the second concave-convex structure.

2. The optical body according to claim 1, wherein
a density of concavities and convexities of the second concave-convex structure is smaller than a density of concavities and convexities of the first concave-convex structure.

3. The optical body according to claim 1, wherein
a thickness of the optical film is from 1 μm to 60 μm.

4. The optical body according to claim 1, wherein
an average period of concavities and convexities of the second concave-convex structure is less than or equal to visible light wavelengths.

5. The optical body according to claim 1, wherein
the master film is provided with a base material film, and a concave-convex resin layer formed on one surface of the base material film, and
the third concave-convex structure is formed on the concave-convex resin layer.

6. The optical body according to claim 1, wherein
at least one from among the first to third concave-convex structures is formed by a cured light-curing resin.

7. The optical body according to claim 1, wherein
a spectral reflectance for wavelengths from 350 nm to 800 nm of the surface on which is formed the first concave-convex structure is from 0.1% to 1.8%, and
a spectral reflectance for wavelengths from 350 nm to 800 nm of the surface on which is formed the third concave-convex structure is from 0.1% to 1.5%.

8. The optical body according to claim 1, wherein
the optical film is formed in a solid cast.

9. The optical body according to claim 1, further comprising:
an adhesive layer that covers the second concave-convex structure.

10. The optical body according to claim 9, wherein
a thickness of the adhesive layer is from 1 μm to 50 μm.

11. The optical body according to claim 1, wherein
following conditions (b) and (c) do not apply:
(b) a release agent is present on a surface of the third concave-convex structure that faces the first concave-convex structure; and
(c) an inorganic film is present on the surface of the third concave-convex structure that faces the first concave-convex structure.

12. An optical film adhesive body, comprising:
an adherend; and
the optical body according to claim 1, wherein the adherend is attached to the optical film via an adhesive layer.

13. A method for manufacturing the optical body according to claim 1, the method comprising:
a step of preparing a first master, on a surface of which is formed a fourth concave-convex structure having a reverse shape of the third concave-convex structure;
a step of preparing a second master, on a surface of which is formed a fifth concave-convex structure having a reverse shape of the second concave-convex structure;
a step of producing the master film, using the first master as a transfer mold; and
a step of forming the optical film on the master film, using the master film and the second master as a transfer mold.

14. The method for manufacturing an optical body according to claim 13, the method comprising:

a step of transferring the fourth concave-convex structure of the first master to an uncured resin layer for the master film, thereby forming the third concave-convex structure on a surface of the uncured resin layer for the master film;

a step of producing the master film by curing the uncured resin layer for the master film;

a step of transferring the third concave-convex structure formed on the surface of the master film to one surface of an uncured resin layer for the optical film, thereby forming the first concave-convex structure on the one surface of the uncured resin layer for the optical film;

a step of transferring the fifth concave-convex structure of the second master to an other surface of the uncured resin layer for the optical film, thereby forming the second concave-convex structure on the other surface of the uncured resin layer for the optical film; and a step of producing the optical film by curing the uncured resin layer for the optical film.

15. The method for manufacturing an optical body according to claim 14, wherein the uncured resin layer for the master film is formed on a base material film.

16. The method for manufacturing an optical body according to claim 14, wherein at least one of the uncured resin layer for the master film and the uncured resin layer for the optical film is made up of an uncured light-curing resin.

17. The method for manufacturing an optical body according to claim 13, wherein an aspect ratio of the second concave-convex structure is smaller than an aspect ratio of the first concave-convex structure, the aspect ratio of the first concave-convex structure is a ratio of a height of the convexities constituting the first concave-convex structure and a diameter of a bottom face of the concavities constituting the first concave-convex structure, and the aspect ratio of the second concave-convex structure is a ratio of a height of the convexities constituting the second concave-convex structure and a diameter of a bottom face of the concavities constituting the second concave-convex structure.

18. The method for manufacturing an optical body according to claim 13, wherein a density of the concavities and convexities of the second concave-convex structure is made smaller than a density of the concavities and convexities of the first concave-convex structure.

19. The method for manufacturing an optical body according to claim 13, wherein a thickness of the optical film is made to be from 1 μm to 60 μm.

20. The method for manufacturing an optical body according to claim 13, wherein an average period of concavities and convexities of the fifth concave-convex structure is less than or equal to visible light wavelengths.

21. The method for manufacturing an optical body according to claim 13, further comprising:

a step of forming an adhesive layer on the second concave-convex structure formed on the optical film.

22. The method for manufacturing an optical body according to claim 21, wherein a thickness of the adhesive layer is made to be from 1 μm to 50 82 m.

* * * * *